United States Patent [19]
Shimogori

[11] Patent Number: 5,973,686
[45] Date of Patent: Oct. 26, 1999

[54] GUI EDITION AIDING APPARATUS, GUI EDITION AIDING METHOD, AND RECORD MEDIUM RECORDING GUI EDITION AIDING PROGRAM

[75] Inventor: Nobuhiro Shimogori, Kawasaki, Japan

[73] Assignee: Kabushiki Kaisha Toshiba, Kanagawa-ken, Japan

[21] Appl. No.: 08/940,971

[22] Filed: Sep. 30, 1997

[30] Foreign Application Priority Data

Sep. 30, 1996 [JP] Japan .................................. 8-259535
Aug. 8, 1997 [JP] Japan .................................. 9-214560

[51] Int. Cl.$^6$ ........................................................ G06F 3/00
[52] U.S. Cl. .......................... 345/333; 345/334; 345/335; 345/967
[58] Field of Search ................................... 345/333, 334, 345/335, 336, 967

[56] References Cited

U.S. PATENT DOCUMENTS

| | | | |
|---|---|---|---|
| 5,347,629 | 9/1994 | Barrett et al. | 345/333 |
| 5,530,796 | 6/1996 | Wang | 395/156 |
| 5,559,947 | 9/1996 | Wugofshi | 345/334 |
| 5,603,034 | 2/1997 | Swanson | 345/333 |
| 5,721,847 | 2/1998 | Johnson | 345/333 |
| 5,764,226 | 6/1998 | Consolatti et al. | 345/333 |

OTHER PUBLICATIONS

CHI 95 Conference Proceedings pp. 43–50; May 1995, Landy et al., "Interactive Sketching for the Early Stages of User Interface Design".

*Primary Examiner*—Raymond J. Bayerl
*Assistant Examiner*—Chadwick A Jackson
*Attorney, Agent, or Firm*—Banner & Witcoff, Ltd.

[57] ABSTRACT

The GUI edition aiding apparatus is for editing a display screen that a computer application program provides. In this apparatus, predetermined data that composes display parts is input. In addition, a selecting command for selecting a first display part from the display parts displayed on the display screen is issued. Moreover, a converting command for converting the first display part is issued. Thus, the first display part is converted into a desired second display part corresponding to a display state of the GUI. With the apparatus, GUI parts can be easily selected corresponding to the display state of the GUI. Thus, a user-friendly GUI can be effectively edited.

20 Claims, 24 Drawing Sheets

FIG.4A

| 401 | 402 | 403 | 404 | 405 | 406 | 407 | 408 | 409 | 410 | 411 |
|---|---|---|---|---|---|---|---|---|---|---|
| NUMBER OF ELEMENTS | NUMBER OF ELEMENTS | ELEMENT NUMBER | NUMBER OF LOWER ELEMENTS | CHARACTER STRING | PART NAME | VALUE | STATE | POSITION | SIZE | LOWER ELEMENT |

FIG.4B

| 1 | 1 | 1 | 0 | FILE | LABEL | VALID | 10×10 | 50×10 | |

FIG.12A

| 1 | 1 | 0 | FILE | MENU | | VALID | 10×10 | 50×10 | |

FIG.12B

| 2 | 4 | 1 | 0 | NEW | BUTTON | VALID | 50×10 | |

FIG.12C

| 3 | | 2 | 0 | OPEN | BUTTON | VALID | 50×10 | |

FIG.12D

| 4 | | 3 | 0 | SAVE | BUTTON | VALID | 50×10 | |

FIG.12E

| 5 | | 4 | 0 | EXIT | BUTTON | VALID | 50×10 | |

FIG.21A

[Form3 window]
- AGE
- AGE 20 BELOW
- AGE 30 TO AGE 40
- AGE 20 TO AGE 30
- AGE 40 TO AGE 50
- AGE 50 TO AGE 60
- AGE 60 OVER
- OK
- CANCEL

RIGHTWARD →
UPWARD ↑

FIG.21B

[Form3 window with dashed selection region 211]
- AGE
- AGE 20 BELOW
- AGE 30 TO AGE 40
- AGE 20 TO AGE 30
- AGE 40 TO AGE 50
- AGE 50 TO AGE 60
- AGE 60 OVER
- OK
- CANCEL

RIGHTWARD →
UPWARD ↑

FIG.24A

Form4
NATIONALITY:   SEX:
JAPAN          MALE
OTHER THAN     FEMALE
JAPAN

FIG.24B

Form4
NATIONALITY:
  ● SEX:
  ○ JAPAN
  ○ MALE
  ○ OTHER THAN JAPAN
  ○ FEMALE

FIG.24C

Form4
NATIONALITY:     SEX:
● JAPAN          ● MALE
○ OTHER THAN     ○ FEMALE
  JAPAN

GUI EDITION AIDING APPARATUS, GUI EDITION AIDING METHOD, AND RECORD MEDIUM RECORDING GUI EDITION AIDING PROGRAM

BACKGROUND OF THE INVENTION

1. Field of the Invention

The present invention relates to a GUI (Graphical User Interface) edition aiding apparatus for aiding the edition of a GUI such as a computer application program.

2. Description of the Related Art

Graphical user interfaces are sometimes designed and created by GUI edition aiding apparatuses (also referred to as GUI builders).

In a conventional GUI edition aiding apparatus, buttons and lists that are referred to as GUI parts are selected from a palette and disposed in a window frame whose size can be freely changed so as to design and create a GUI. This operation is performed by a designer (user) of the GUI. With a display screen of the GUI, data that is exchanged between a computer and a user thereof is represented as a display screen of the GUI. When a GUI is designed and created with such a GUI edition aiding apparatus, the following problem takes place.

With the GUI edition aiding apparatus, screens of the GUI can be easily designed and created in such a manner that the user draws pictures. However, since the user tends to design and create a GUI without a final image thereof, the user should modify the GUI later on. That is, it often happens to add display parts and change functions in a designing process. In particular, in the case of data of which one is selected from a plurality of alternatives, other alternatives may be added later on. The GUI parts are categorized as a fixed type and a non-fixed type depending on whether alternatives will be added later on. In the case of the fixed type, if alternatives are added later on, relevant screens of the GUI should be recreated. Thus, the user should design and create a GUI considering what and how parts are used with the final image thereof.

For example, when the user creates a GUI of which one is selected from a plurality of alternative, he or she can use representing means (parts) such as pull-down menus, exclusive buttons, and list boxes. In this case, the use of these means depends on operation types and the preference of the user (designer).

In this case, the conventional GUI edition aiding apparatus cannot properly change a particular representing means to another representing means. Thus, when a particular part has been used, if it is substituted with another one, an operation equivalent to the restructure of a GUI screen thereof should be required.

In addition, before creating a real system, the user should create a mock-up thereof. However, it is very troublesome and inconvenient to create the mock-up itself.

SUMMARY OF THE INVENTION

The present invention is made from the above-described point of view. An object of the present invention is to provide a GUI edition aiding apparatus that allows the user to design and create GUI interactive screens that are superior in operation and maintenance, a GUI edition aiding method, and a record medium recording a GUI edition aiding program thereof.

Another object of the present invention is to provide a GUI edition aiding apparatus considering what part is a GUI part to be converted, a GUI edition aiding method thereof, and a record medium recording a GUI edition aiding program thereof.

A further object of the present invention is to provide a GUI edition aiding apparatus considering the current position of a GUI part to be converted, a GUI edition aiding method thereof, and a record medium recording a GUI edition aiding program thereof.

To solve the above-described problem, the present invention is an apparatus for creating a display screen including display parts, comprising a first selecting means for selecting a second display part into which a first display part is converted when a first command is issued for the first display part displayed on the display screen, and a first controlling means for displaying the second display part instead of the first display part on the display screen.

According to the present invention, when the user selects one GUI object (display part) from a GUI that is being designed and then presses a conversion key, the currently displayed part is converted into another display part. For example, when the user selects a label "OK" and presses the conversion key, the label "OK" is converted into a text field "OK". When the user presses the conversion key once again, the text field "OK" is converted into a button "OK". When the user presses the conversion key once again, the button "OK" is converted into an option button "OK". When the user selects one object, objects such as "label", "text field", "button", and "check box" become conversion alternatives.

Likewise, when the user selects a plurality of GUI objects, objects "a set of labels", "a set of text fields", "a text field with a plurality of lines", "a set of command buttons", "a set of check boxes", "a set of option buttons", "a list box", "a combo box", "a drop-down list box", "a tab dialog", and "a tree view" become conversion alternatives. The above applications such as a label is merely examples. The present invention is not limited to the above applications.

The order of such selection alternatives can be changed and/or learnt with the frequency of the use of each part and the label name thereof.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4A is a schematic diagram showing an example of part data stored in a part storing portion shown in FIG. 1;

FIG. 4B is a schematic diagram showing an example of part data stored in the part storing portion shown in FIG. 1;

FIGS. 12A to 12E are schematic diagrams showing part data stored in the part storing portion shown in FIG. 1;

FIGS. 21A and 21B are schematic diagrams showing an example of a display screen for explaining the fourth embodiment of the present invention;

FIGS. 24A to 24C are schematic diagrams showing examples of display screens for explaining the fifth embodiment of the present invention;

DESCRIPTION OF PREFERRED
EMBODIMENTS

Figure 1:
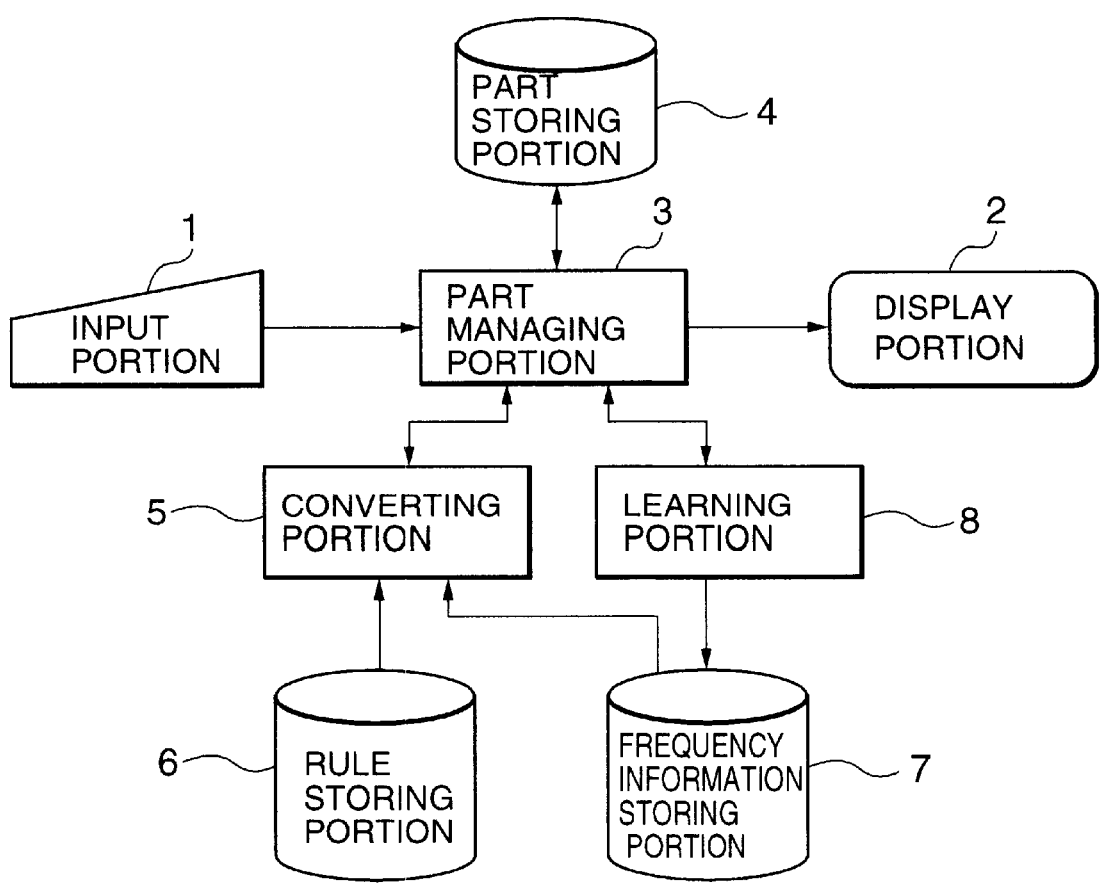
FIG. 1 is a block diagram showing the structure of a GUI edition aiding apparatus according to a first embodiment of the present invention.

FIG. 1 is a block diagram showing the structure of a GUI edition aiding apparatus according to a first embodiment of the present invention. Referring to FIG. 1, an input portion 1 inputs character string data and bit map data used in a GUI to be created and commands and so forth corresponding to each operation condition. The input portion 1 is accomplished by a pointing device such as a keyboard, a mouse, and so forth. A displaying portion 2 displays various kinds of internal data handled by a computer to the user. In this example, the display portion 2 displays display parts such as windows (forms) and labels and a mouse cursor. In addition to text data, the display portion 2 displays graphical data. The display portion 2 is accomplished by a so-called display or the like. The input portion 1 and the display portion 2 compose a user interface.

A part managing portion 3 performs various managing processes for part data displayed on the display portion 2 corresponding to various types of input information received from the input portion 1. The detail of the part managing portion 3 will be described later. A part storing portion 4 stores character string data and bit map data received from the input portion 1 as part data. A converting portion 5 converts part data received from the part managing portion 3 corresponding to both a conversion rule stored in a rule storing portion 6 and conversion frequency information stored in a frequency storing portion 7. A learning portion 8 learns the frequency information corresponding to a predetermined learning algorithm and thereby updates the frequency information stored in the frequency information storing portion 7.

Next, the part managing portion 3 will be described in detail.

Figure 2:
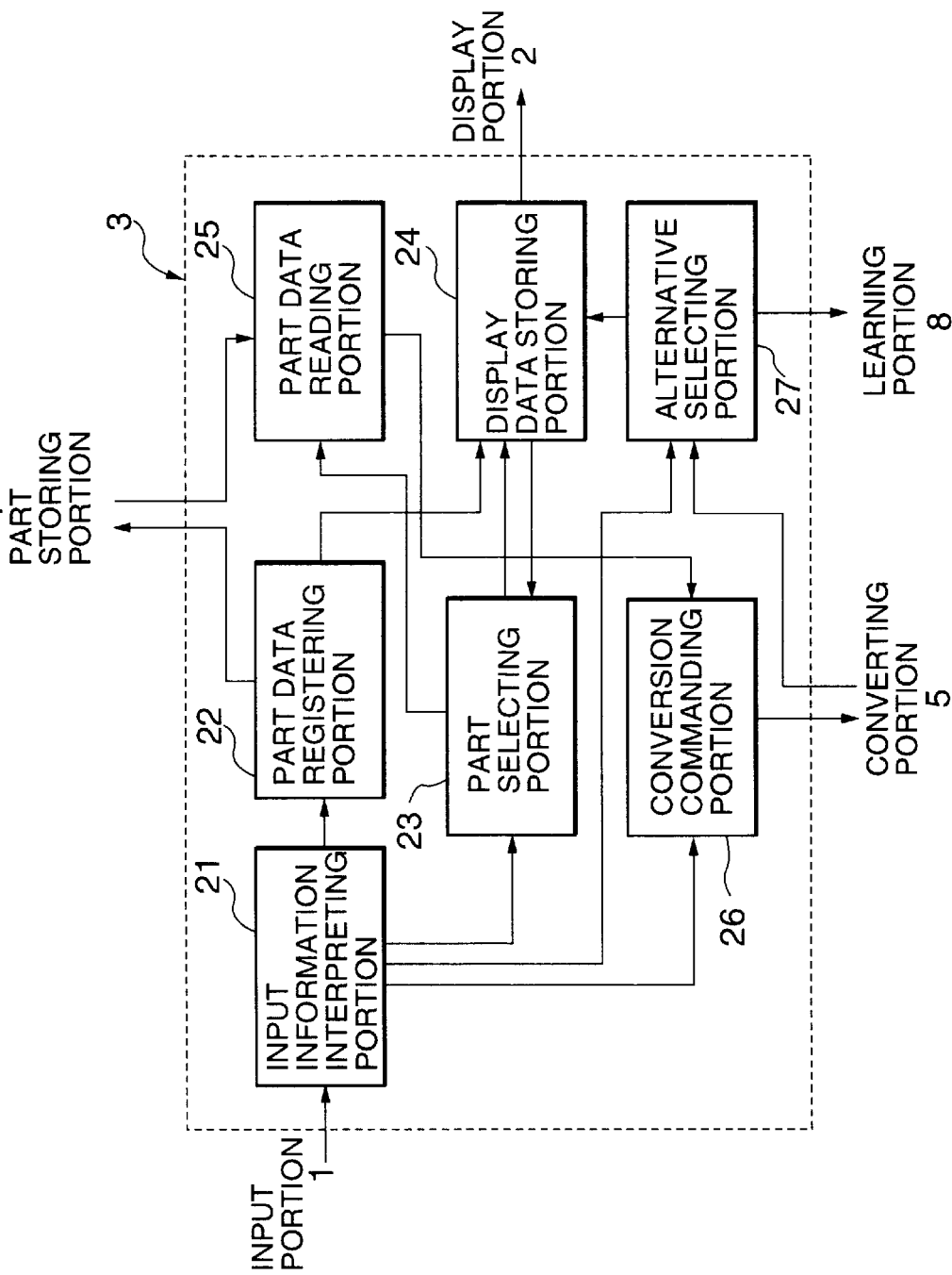
FIG. 2 is a block diagram showing the structure of a part managing portion sown in FIG. 1.

FIG. 2 is a block diagram showing the structure of the part managing portion 3. In FIG. 2, an input information interpreting portion 21 interprets whether input information received from the input portion 1 is a command (or the like), character string data, or bit map data. The input information interpreting portion 21 outputs data or control information to each portion (that will be described later) corresponding to the interpreted result. This interpreting process is frequently performed corresponding to the operation state and input mode.

When the input information interpreting portion 21 has interpreted that the input information received from the input portion 1 is character string data or bit map data, the input information interpreting portion 21 sends the character string data or the like to a part data registering portion 22. The part data registering portion 22 sends the received character string data and bit map data as part data to the part storing portion 4.

When the input information interpreting portion 21 has interpreted that the input information received from the input portion 1 is a part selecting command, the input information interpreting portion 21 sends the input information to a part selecting portion 23. The part selecting portion 23 selects a relevant part (or a relevant set of parts) corresponding to the input information. In other words, the part selecting portion 23 selects a display part corresponding to both position information that composes the input information and screen information stored in a display data storing portion 24. In this case, the part selecting portion 23 may select a plurality of display parts corresponding to the input information. When the part selecting portion 23 has selected a display part, the part selecting portion 23 sends the resultant information to a part data reading portion 25. In addition, the part selecting portion 23 updates display data stored in the display data storing portion 23 so as to allow the user to know that the display part has been selected. The part data reading portion 25 reads the relevant part data from the part storing portion 4 corresponding to the information of the display part and temporarily stores the content.

When the input information interpreting portion 21 has interpreted that the input information is a part converting command, the input information interpreting portion 21 sends the input information to a conversion commanding portion 26. The conversion commanding portion 26 reads the part data from the part data reading portion 25 and sends the part data to the converting portion 5. In other words, the part data corresponds to the display part selected by the part selecting portion 23. The converting portion 5 creates a list of alternatives of the selected part data (a set of parts) corresponding to both the conversion rule stored in the rule storing portion 6 and the frequency information stored in the frequency information storing portion 7 and returns the list to an alternative selecting portion 27. The alternative selecting portion 27 selects one from the list of alternatives and rewrites the content of the display data storing portion 24 corresponding to the selected alternative. Thus, the converted result is displayed on the screen of the display portion 2.

A next alternative is selected from the top of the list of alternatives. After all the alternatives have been selected, another alternative is selected from the top of the list of alternatives. This process is accomplished in such a manner that when a converting command is successively input from the input portion 1, the input information interpreting portion 1 interprets the converting command as a next alternative interpreting command and sends the converting command to the alternative selecting portion 27.

When the input, information interpreting portion 21 has interpreted that the input information received from the input portion 1 is a part deselecting command, the input information interpreting portion 21 sends the input information to the part selecting portion 23 and the alternative selecting portion 27. The part selecting portion 23 updates display data of the display data storing portion 24 so as to allow the user to know that the display part has been deselected. On the other hand, the alternative selecting portion 27 sends the finally selected display part to the learning portion 8.

Next, an example of the operation of the GUI edition aiding apparatus according to the present invention will be described.

Figure 3:
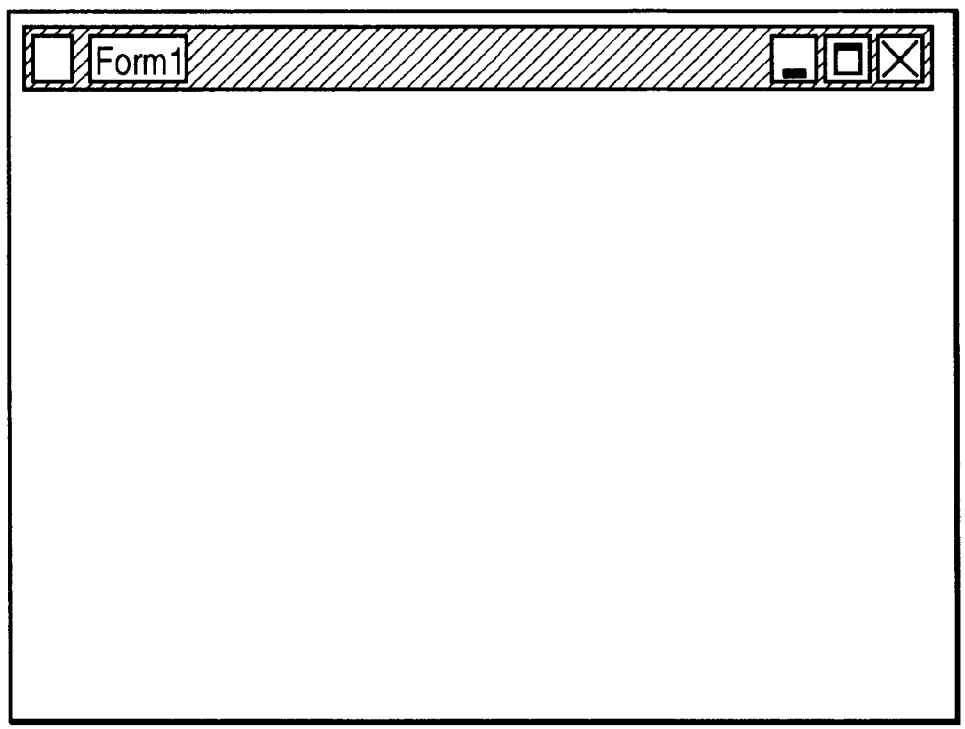
FIG. 3 is a schematic diagram showing an example of an initial state of a window.

When the GUI edition aiding apparatus gets started, as an initial state of the display portion 2, a window (form) in which no part is disposed is displayed. FIG. 3 shows an example of the initial state of a window. In this example, no part is disposed. However, default parts may be defined and displayed as the initial state.

Now, it is assumed that five character strings are input from the input portion 1. In this example, five character strings "file", "save", "new save", "open", and "exit" are created. For example, after the user designates any position on the window with the pointing device such as a mouse (not shown), inputs a relevant character string from the input portion 1, and confirms the entry, the part data registering portion 22 creates one piece of part data composed of the character string data and preset frame data. The part data is stored in the part storing portion 4.

FIGS. 4A and 4B are schematic diagrams showing examples of part data stored in the part storing portion 4. As shown in FIG. 4A, part data is composed of a GUI part number 401, the number of elements 402, an element number 403, the number of lower elements 404, a character string 405, a part name 406, a value 407, a state 408, a position 409, a size 410, and a lower element 411. It is assumed that a character string that is received from the input portion 1 is stored with a format referred to, for examples, "label". When a character string "file" is input, data as shown in FIG. 4B is created and stored.

Next, each item of part data will be described in detail.

The GUI part number 401 is a unique number of the part.

The number of elements 402 is the number of parts in the same hierarchical level of the same group. In this example, since the part data contains only one label "file", the number of elements is 1.

The element number 403 is a unique number of each part in the same hierarchical level of the same group.

The number of lower elements 404 is the number of parts in lower hierarchical levels in the case that a part and another part have a hierarchical relation. The character string 405 is a character string that each part represents.

The part name 406 is the name of the part.

The value 407 is the value of each part. For example, in the case of a check box, when it is checked, the value 407 is 1. When the check box is not checked, the value 407 is 0. When the part does not have a value, the value 407 is null. The value 407 depends on each part.

The state 408 is the state of each part. In the case of a button, when it cannot be operated, the state 408 is invalid. When the part can be operated, the state 408 is valid. The state 408 depends on each part.

The position 409 is the position of each part in the window. For example, the position 409 is represented with the number of pixels.

The size 410 is the size of each part.

The lower element 411 is information of parts in lower hierarchical levels. When there is no lower part, the lower element 411 is null.

Figure 5:
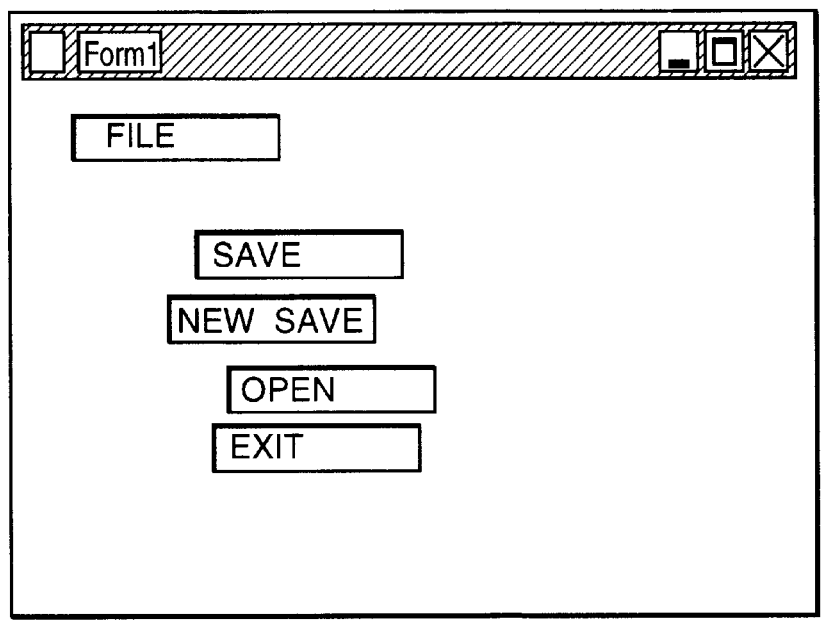
FIG. 5 is a schematic diagram showing a window in which character strings have been input.

FIG. 5 shows a window of which the above-described five character strings have been input. The above-described part data for the labels shown in FIG. 5 is stored.

Figure 6:
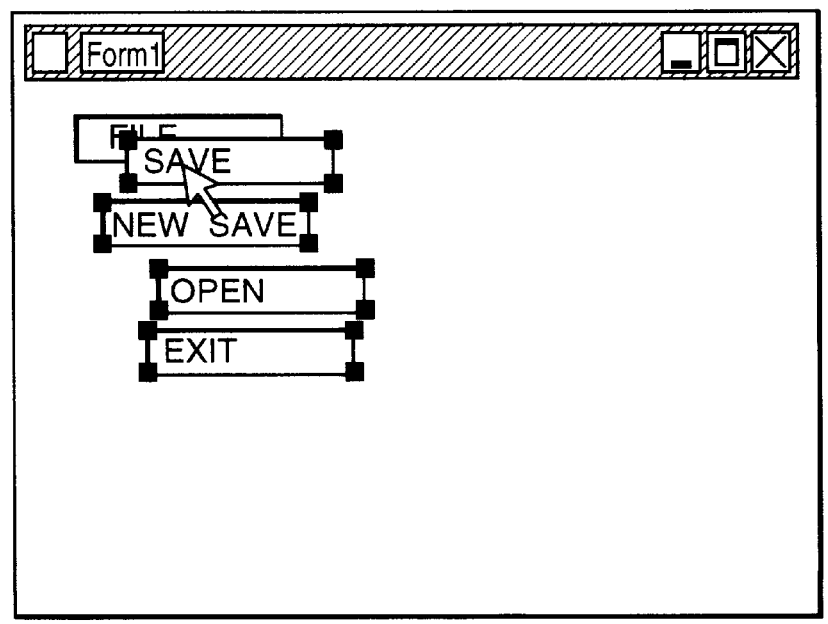
FIG. 6 is a schematic diagram showing an example of a window in which a drag and drop operation is being performed.

Next, the user selects the four labels "save", "new save", "open", and "exit" from the input portion 1 and then drags and drop them to the Label "file". FIG. 6 shows a window in this state. In other words, when the user clicks the mouse at the position of the label (display part) on the window of the display portion 2, a mark that represents that the label has been selected corresponding to the position information of the mouse cursor is displayed. Thus, the user can perform an input operation such as the drag and drop operation. In this example, it is assumed that when the user successively clicks labels with the SHIFT key pressed, he or she can select a plurality of labels. When the user drags the mouse cursor and drops the mouse button in the state the label "file" overlaps with the selected label set, the display part on the window is converted into another display part.

Figure 7:
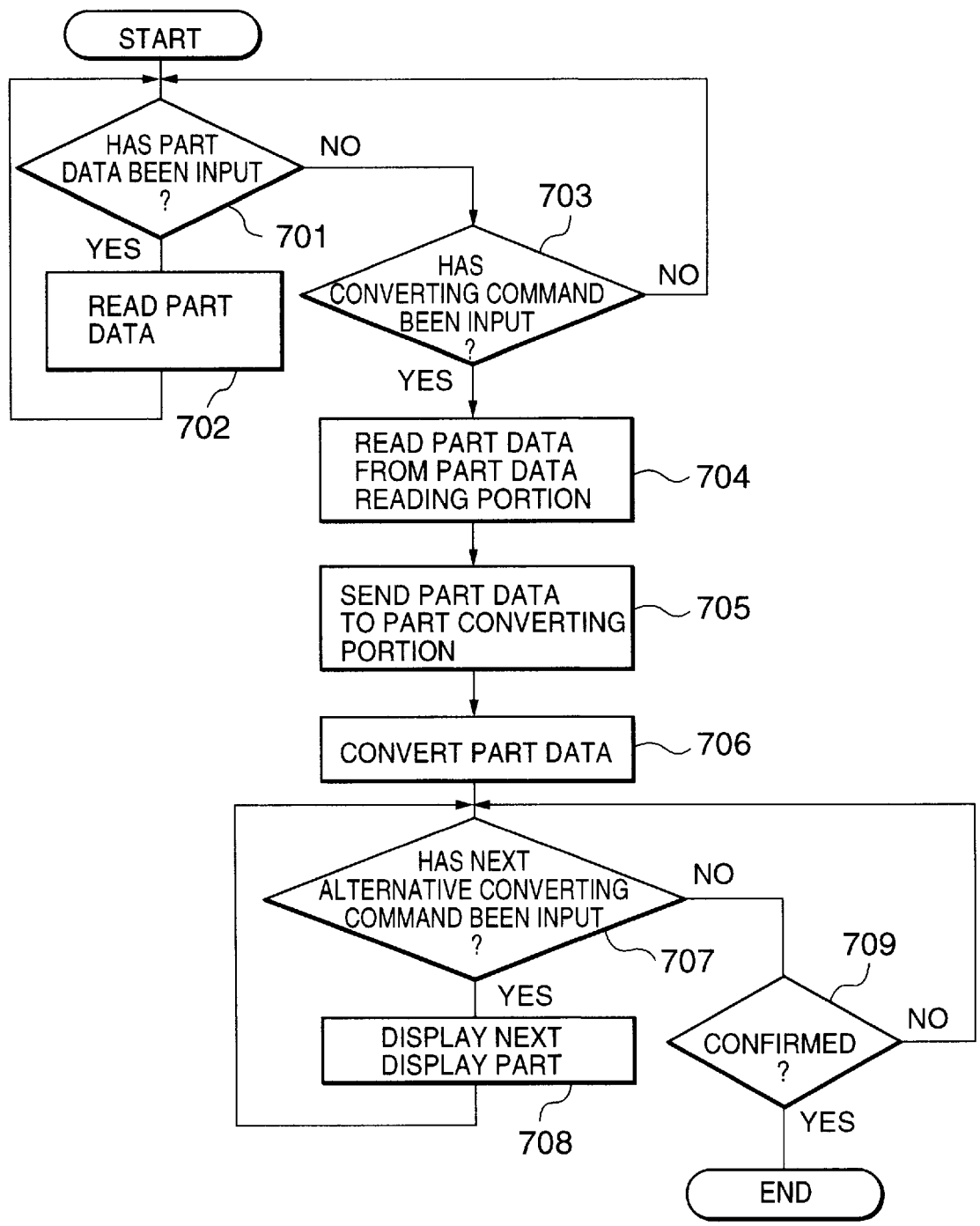
FIG. 7 is a flow chart showing the operation of the GUI edition aiding apparatus according to the first embodiment of the present invention.

FIG. 7 is a flow chart showing operations of the part managing portion 3 and the converting portion 5.

In the part managing portion 3, the part selecting portion 23 selects part data corresponding to the input information that the user has clicked with the mouse (at step 701) and the part data reading portion 25 reads the part data (at step 702). The conversion commanding portion 26 reads part data from the part data reading portion 25 (at step 704) and sends the part data to the converting portion 5 (at step 705). The converting portion 5 converts the part data into another part data (for example a combo box) (at step 706).

Figure 8:
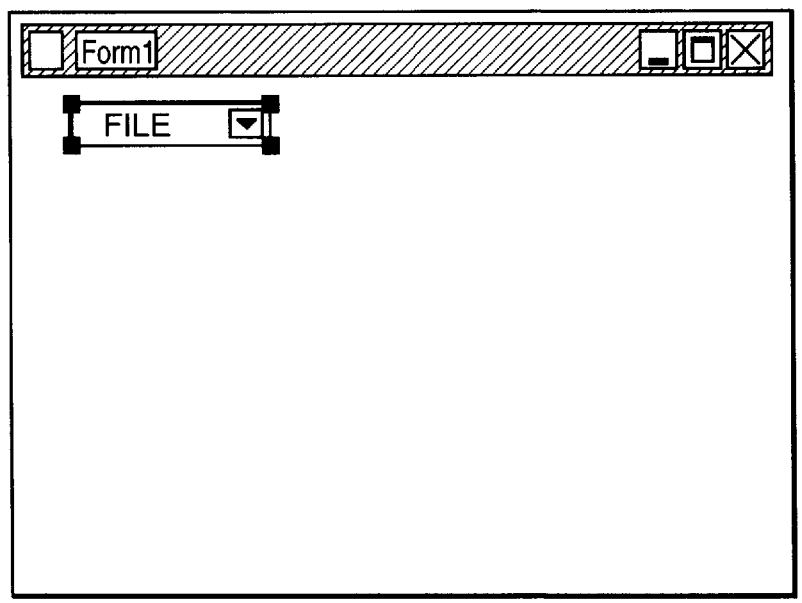
FIG. 8 is a schematic diagram showing an example of a window of which a label group shown in FIG. 6 has been changed to a combo box.

FIG. 8 is a schematic diagram showing an example of the state that the set of labels shown in FIG. 6 is converted into a combo box. When the converted display part is not a desired display part, the user inputs a next alternative converting command from the input portion 1 (at step 707). Thus, the next display part is displayed (at step 708).

Figure 9:
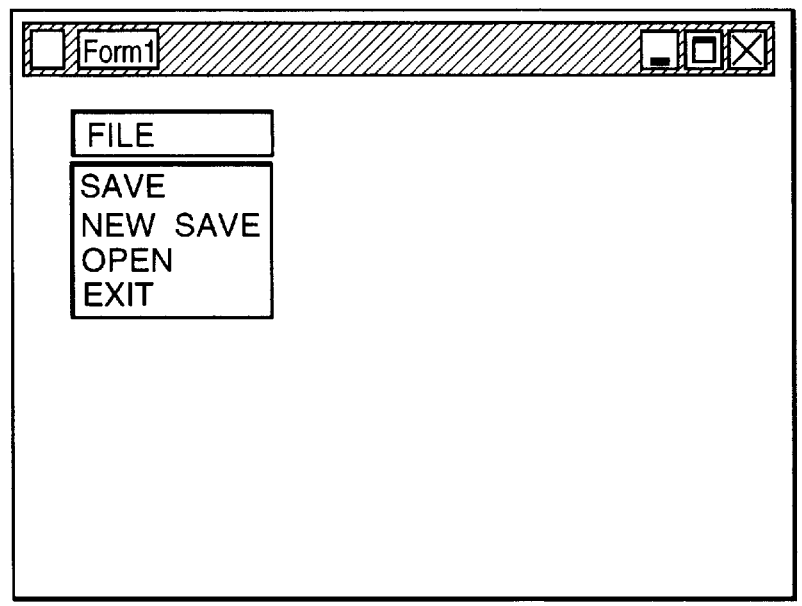
FIG. 9 is a schematic diagram showing an example of a window of which a converted standard combo is displayed with a next alternative converting command.
Figure 10:
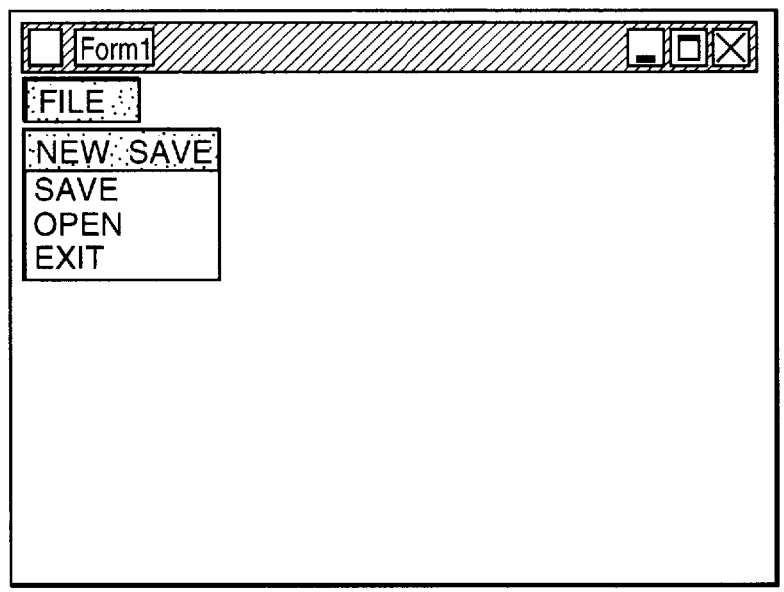
FIG. 10 is a schematic diagram showing an example of a window of which a converted menu is displayed with the next alternative converting command.

FIG. 9 is a schematic diagram showing an example of the state of which a standard combo box is displayed with a next alternative converting command. When the user inputs the next alternative converting command with the input portion 1, a menu as the next alternative is displayed. FIG. 10 is a schematic diagram showing an example of the state of which the menu is displayed with the next alternative converting command. In such a manner, the user repeats the input of the next alternative converting command until a desired display part is displayed. When the desired display part is displayed, the user confirms it with the input portion 1 (at step 709). As a result, the process is completed.

Figure 11:
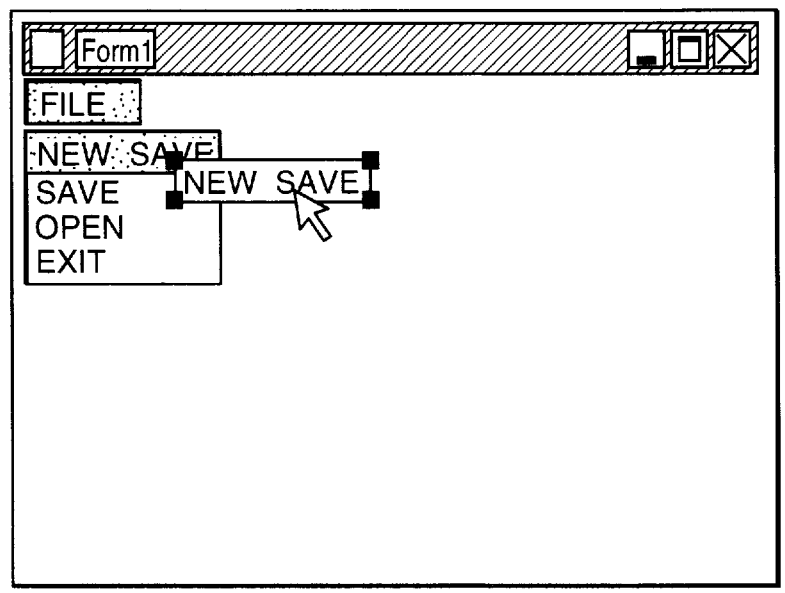
FIG. 11 is a schematic diagram showing an example of a window of which the order of display parts is changed.

When the display parts are not arranged in the desired order, the user can directly move the parts. In other words, the user selects a desired one of the display parts with the input portion 1 and then drags and drops it at a desired position. FIG. 11 is a schematic diagram showing an example of the state of which the order of the display parts is changed.

Assuming that five labels "file", "new", "open", "save", and "exit" are created, all of them are selected at the same time, and they are converted into a menu, part data is stored in the part data storing portion 4 as shown in FIGS. 12A to 12E.

Next, with reference to FIG. 13, the converting process of the GUI edition aiding apparatus according to the embodiment will be described.

Figure 13:
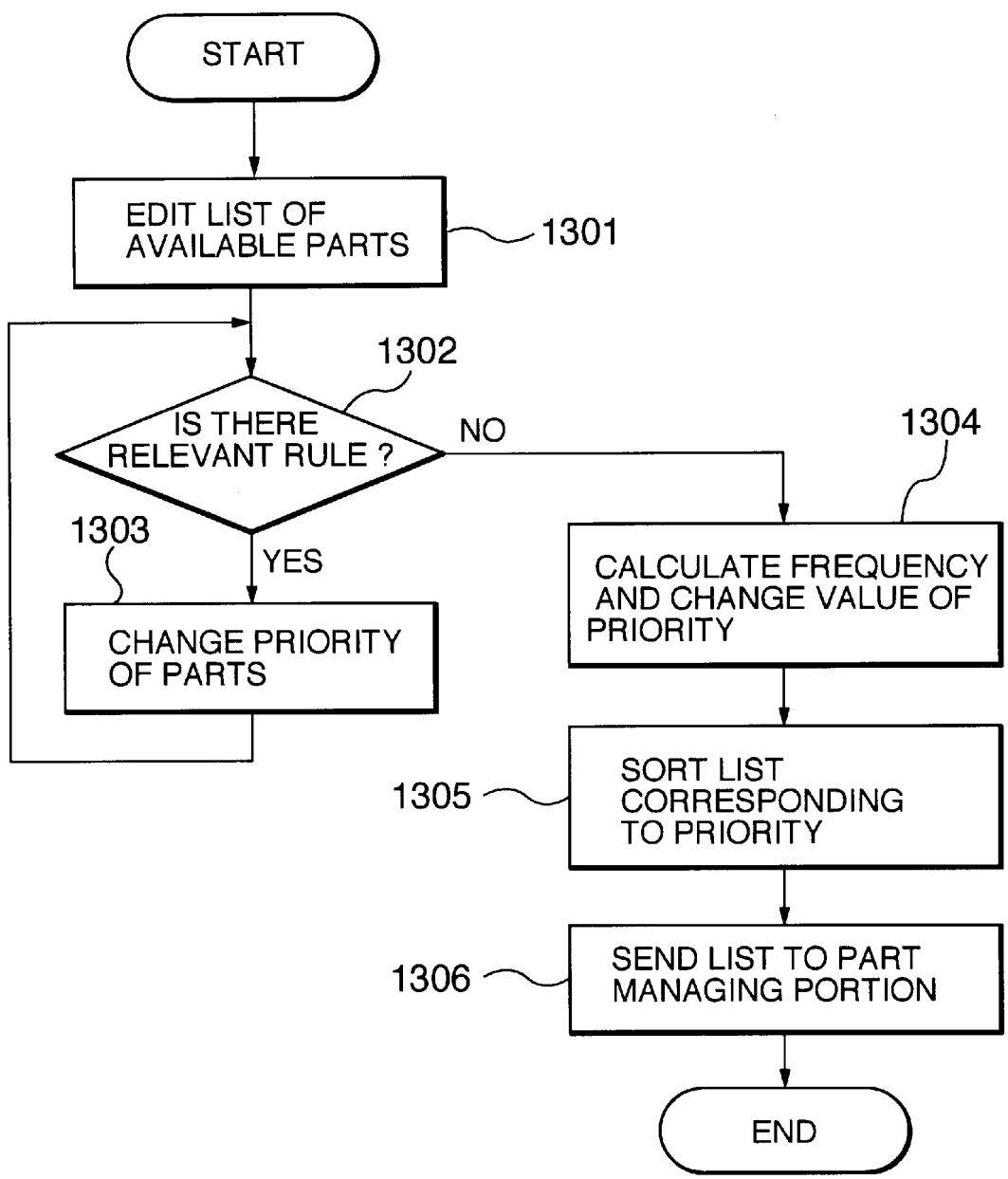
FIG. 13 is a flow chart showing a converting process of the GUI edition aiding apparatus according to the first embodiment of the present invention.

FIG. 13 is a flow chart showing the converting process of the GUI edition aiding apparatus according to the embodiment.

When obtaining part data, the converting portion 5 creates a list of available parts (at step 1301). The converting portion 5 creates the list in a predetermined format. In the case that one part has been selected, the format is defined in such a manner that "a label", "a text", "a button", and "a check button" can be selected. In the case that a plurality of parts have been selected, the form is defined in such a manner that "a set of labels", "a set of text files", "a text field with a plurality of lines", "a set of command buttons", "a set of check boxes", "a set of option buttons", "a list box", "a combo box", "a drop-down list box", "a tab dialog", and "a tree view" can be selected.

Next, the converting portion 5 determines whether or not there is a rule that matches the current state corresponding to a rule stored in the rule storing portion 6 (at step 1302).

Examples of rules stored in the rule storing portion 6 are:

Rule 1: if character string="OK" then part name. button+1

The rule 1 represents that when the selected character string is "OK", the priority of the "button" as a part alternative is raised by 1.

Rule 2: if character string="cancel" then part name. menu−1.

The rule 2 represents that when the selected character string is "cancel", the priority of the "menu" as a part alternative is lowered by 1.

Rule 3: if character string 1="file" and character string 2="exit" then part name 1. menu+2; part name*. button+1

The rule 3 represents that in the case that a plurality of parts have been selected and character strings include "file" and "exit", the priorities of the menu and button are raised by 2 and 1, respectively, so that the "file" becomes the menu and the other alternatives become elements of the menu.

Rule 4: if number of elements>20 then part name. option button−1

The rule 4 represents that in the case that the number of selected parts is 20 or more, the priority of the option button is lowered by 1.

It should be noted that the above-described rules are only examples. Thus, the user can add, change, and delete these rules so as to customize the GUI.

When the converting portion 5 has determined that there is a matched rule, the flow advances to step 1303. At step 1303, the converting portion 5 changes the value of the priority of the list of available parts created at step 1301. Thereafter, the flow returns to step 1302. At step 1302, the converting portion 5 determines whether or not there is a matched rule. When there is no matched rule, the converting portion 5 reads the frequency information from the frequency information storing portion 7 and changes the value of the priority of the list of available parts created at step 1301 corresponding to the frequency information (at step 1304). Thereafter, the flow advances to step 1305. At step 1305, the converting portion 5 sorts the list of available parts created at step 1301 corresponding to the priority. The sorted result is sent to the alternative selecting portion 27 of the part managing portion 3 (at step 1306). Thus, the selected alternative is displayed.

After the user confirms the display part, the alternative selecting portion 27 sends the information of the confirmed part data to the learning portion 8. The learning portion 8 adds "1" to the current frequency information of the display part corresponding to the information and updates the frequency information of the frequency information storing portion 7 as new frequency information.

The learning portion 8 can use event base inference, functional learn and neural network and so on, as well as frequency information. In this case, the learning portion 8 stores the structure of a confirmed display part as an event. When there is a similar structure as a past event, the learning portion 8 corrects the past event with the event base inference and creates an alternative.

For example, in the case that there is a menu event of "file", "new", "open", "new save", "save", and "exit" as an old event, when a set of labels "file, new, open, save, exit" is created, the old event is searched as a similar event. Since the searched event is a menu, a "menu" can be easily selected as a conversion alternative.

Next, a second embodiment of the present invention will be described.

When a GUI part is converted, a new part is created or a GUI part that has been created is modified. In the latter case, since the GUI part to be converted may have some meaning, an example of which a part is converted with the type of the current part will be described.

Figure 14:
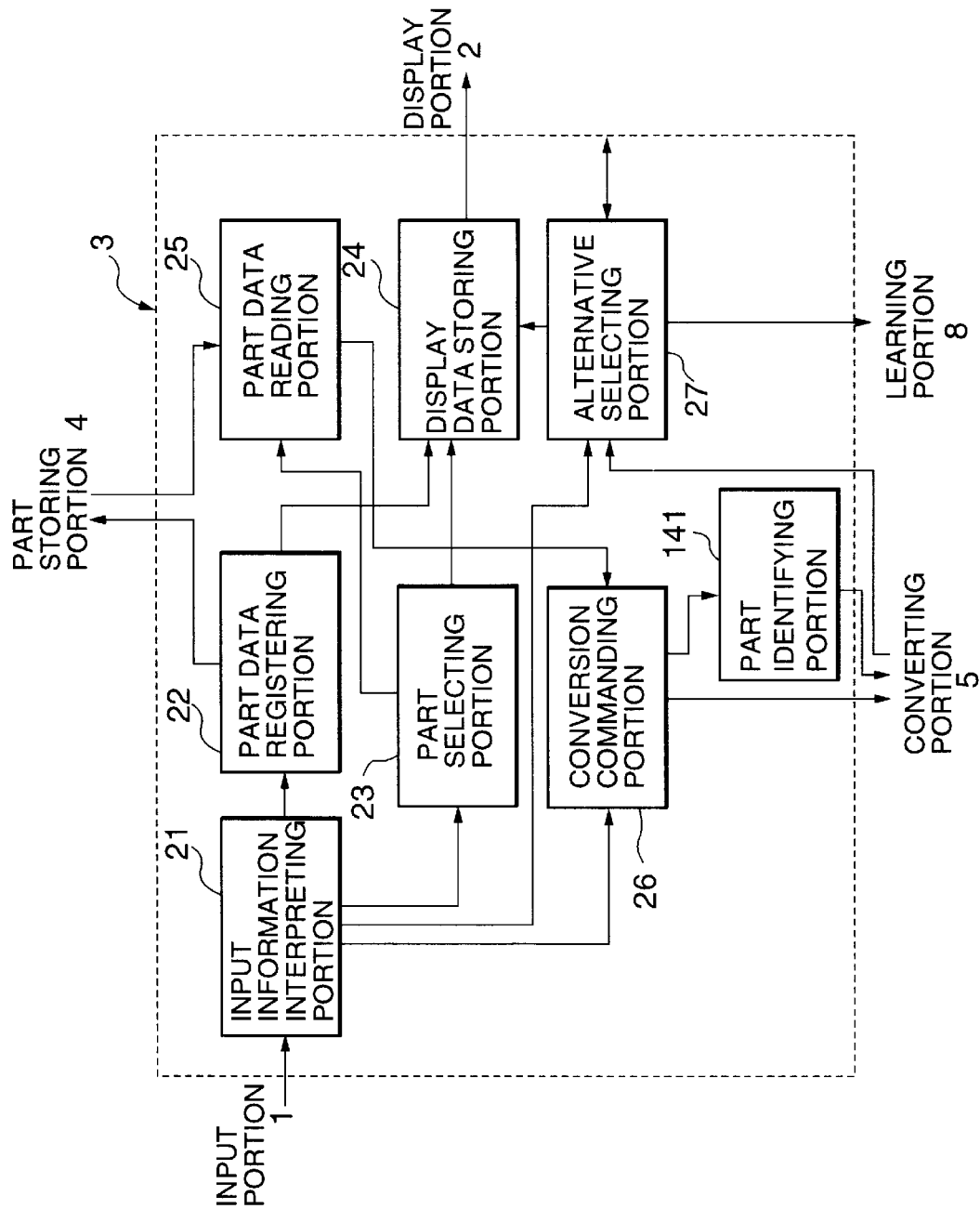
FIG. 14 is a block diagram showing the structure of a GUI edition aiding apparatus according to a second embodiment of the present invention.

FIG. 14 is a block diagram showing the structure of a GUI edition aiding apparatus according to the second embodiment of the present invention. In FIG. 14, for simplicity, similar portions to those of the first embodiment shown in FIG. 2 are denoted by similar reference numerals. A part identifying portion 141 identifies the type of a part to be converted.

Figure 15:
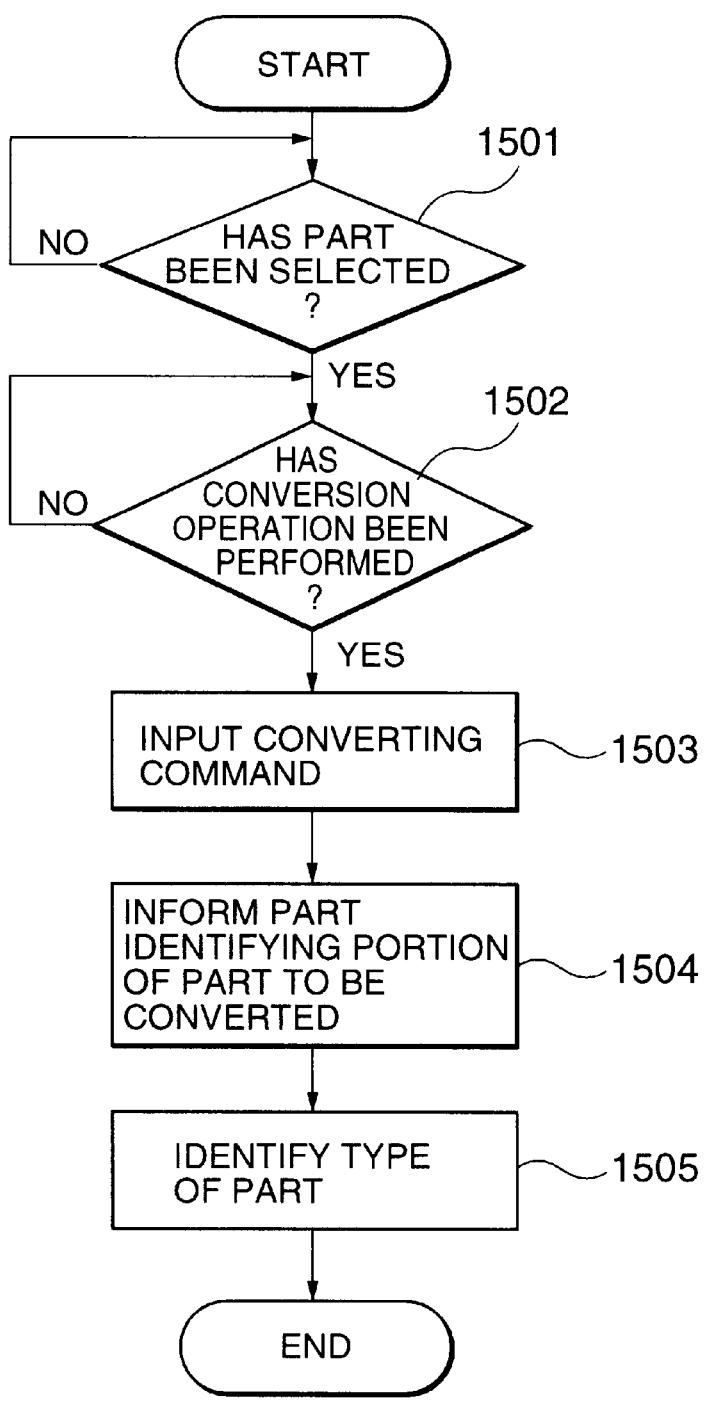
FIG. 15 is a flow chart showing an operation of the GUI edition aiding apparatus according to the second embodiment of the present invention.

FIG. 15 is a flow chart showing the operation of the part identifying portion 11.

Figure 16:
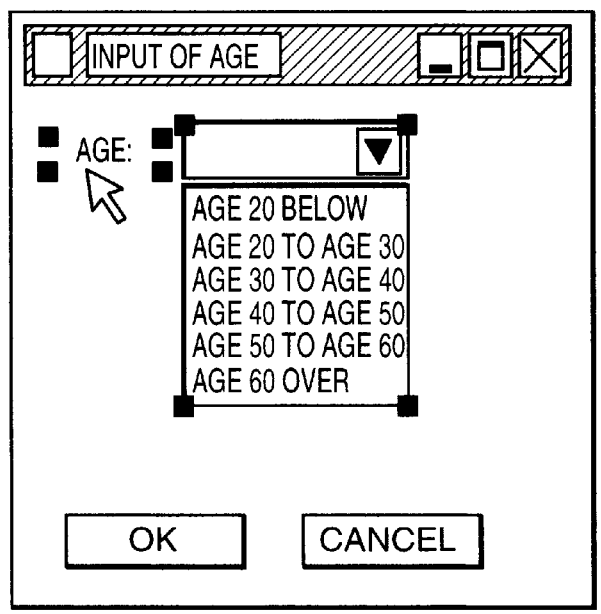
FIG. 16 is a schematic diagram showing an example of a display screen according to the second embodiment of the present invention.

For example, as shown in FIG. 16, when the user selects a GUI part labeled "age:" with the mouse or the like and performs the conversion operation with the conversion key, a conversion commanding portion 26 sends a converting command to a converting portion 5 and informs the part identifying portion 141 of a GUI part to be converted (see FIGS. 4A and 4B). The part identifying portion 141 identifies the type of the part with the data received from the conversion commanding portion 26. In this example, the part identifying portion 141 extracts the following two GUI parts and identifies the types thereof.

label["age":"]( )

combo[ ]("age 20 below","age 20 to age 30","age 30 to age 40","age 40 to age 50","age 50 to age 60","age 60 over")

In this case, each part is denoted as follows.

part type[name](structural element, . . . ), . . .

The part type represents the type of the current part (part name). Examples of the part type are a label, a button, an option, a combo, a frame, a menu, and so forth. In other words, label["age":"]( ) represents a label that has a character string "age:". Since a label does not have a structural element, it is represented by blank parentheses. When one part has a plurality of character strings, they are delimited with commas.

Figure 17:
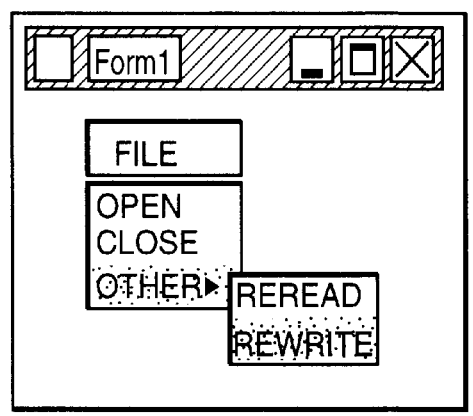
FIG. 17 is a schematic diagram showing an example of a display screen according to the second embodiment of the present invention.

In the case of a GUI part with a hierarchical structure such as a menu, the part has the part type and label name instead of a character string. For example, when a menu is hierarchically represented as shown in FIG. 17, the format thereof is as follows.

menu["file"]("open","close",[menu]("reread","rewrite")

As described above, when the part identifying portion 141 has obtained information of a GUI part, the part identifying portion 141 sends the information of the GUI part to the converting portion 5. The converting portion 5 converts the current GUI part into another GUI part corresponding to the rule stored in the rule storing portion 6.

An example of the notation of a rule is as follows.

part type (character string), part type (character string, . . . ), . . . → part name (character string), part name (character string, . . . )

In other words, the left side (the left side of the arrow) represents a satisfying condition. When the left side is satisfied, the part is converted into a set of parts.

The following rule (The following notation can be used instead of the above if-then rule.):

label[" "]( ) → button["cancel"]( ) represents that a label "cancel" is converted into a button "cancel". Instead of a character string, a variable name can be used.

label[$a+"button"]( ),label[$b]( ) →button[$a]( ).button [$b]( )

When a label "OK button" and a label "cancel" are converted, "OK" and "cancel" are assigned to $a and $b and converted into two buttons "OK" and "cancel", respectively. Now, it is assumed that the rule storing portion 6 stores the following rule.

rule 1[30]:label[$a]( ),combo[$b*] → frame[$a](option [$b*]( ))

rule 2[10]:label[$a]( ) → button[$a*]( )

rule 3[20]:combo[ ]($a*) → kusto[ ]($a*)

rule 4[15]:label[$a]( ),combo[$b*] → menu[$a]($b*)

The value in brackets [ ] represents the intensity (weight) of each rule. A variable with an asterisk "*" represents a plurality of items.

Assuming that the part identifying portion 141 obtains information of a GUI part, the conformance of each rule is given as follows. The conformance of each rule represents the number of conditions that are satisfied.

Rule 1=2
Rule 2=1
Rule 3=1
Rule 4=2

When the intensity of each rule is multiplied by the conformance, the priority of each rule is given as follows.

Rule 1=60
Rule 2=10
Rule 3=20
Rule 4=30

Thus, the priority of conversion alternatives is in the order of the rule 1, rule 4, rule 3, and rule 2.

Next, a third embodiment of the present invention will be described.

In the third embodiment, a proper GUI part is more effectively designated as a selection alternative corresponding to the screen on which the GUI part is disposed or to the position in the window.

Figure 18:
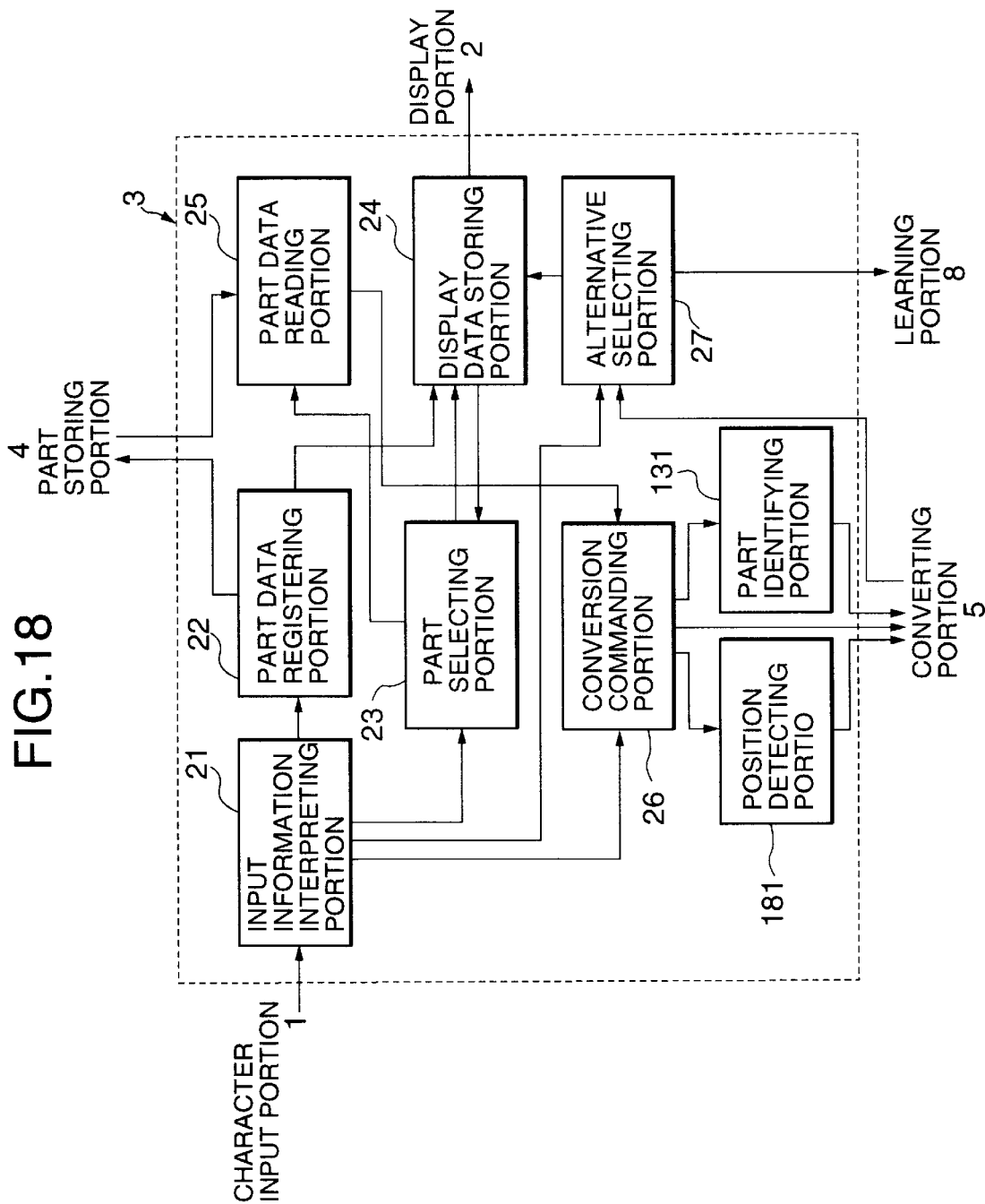
FIG. 18 is a block diagram showing the structure of a GUI edition aiding apparatus according to a third embodiment of the present invention.

FIG. 18 is a block diagram showing the structure of a GUI edition aiding apparatus according to the third embodiment of the present invention.

In FIG. 18, a position calculating portion 181 calculates the position of a current GUI part on the screen. The position of each GUI part on the screen is represented with both the ratio between the center position of each GUI part and the upper edge of the screen and the ratio between the center position of each GUI part and the left edge of the screen.

Figure 19:
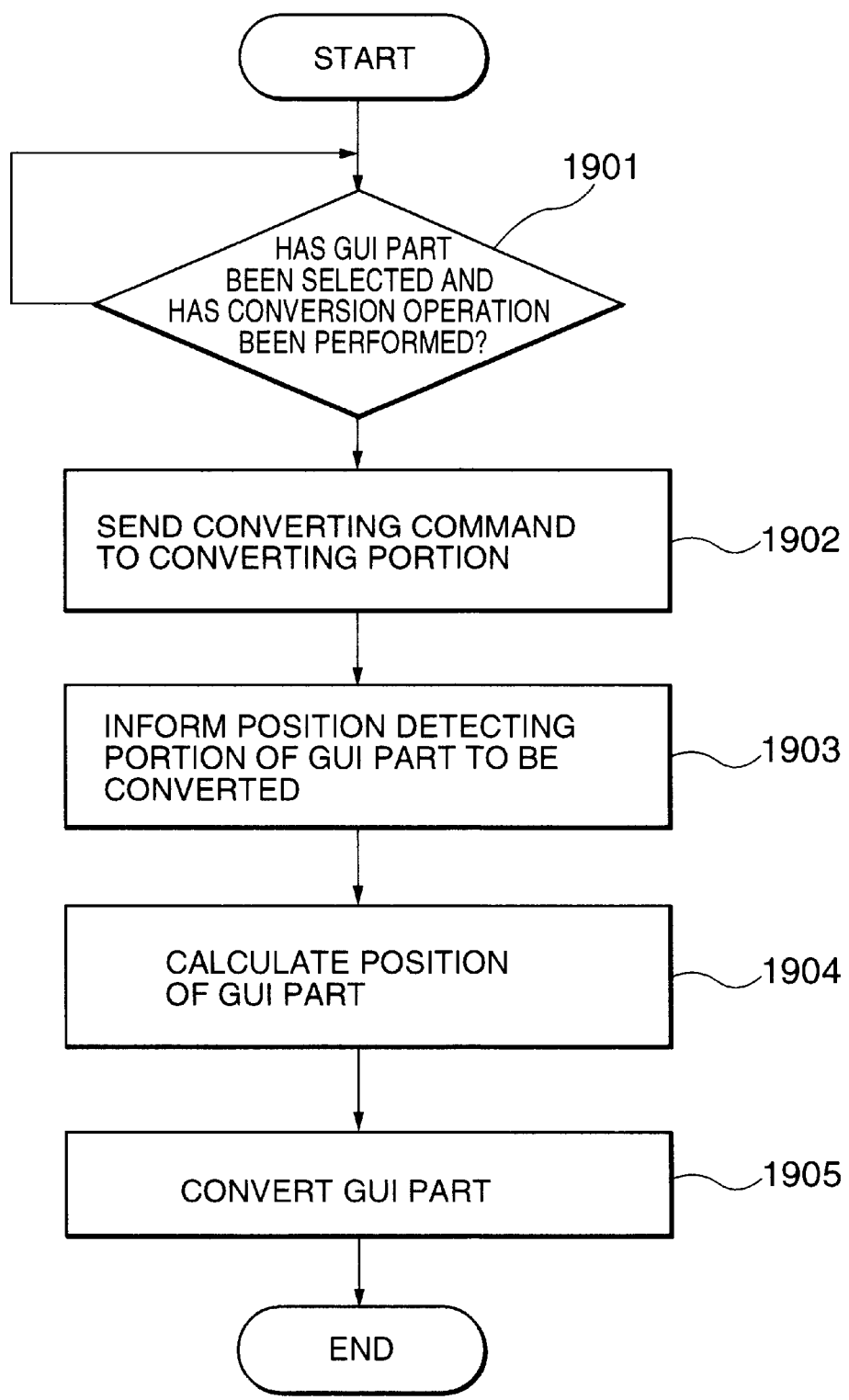
FIG. 19 is a flow chart showing an operation of the GUI edition aiding apparatus according to the third embodiment of the present invention.

FIG. 19 is a flow chart showing the operation of the GUI edition aiding apparatus according to the third embodiment of the present invention.

Figure 20:
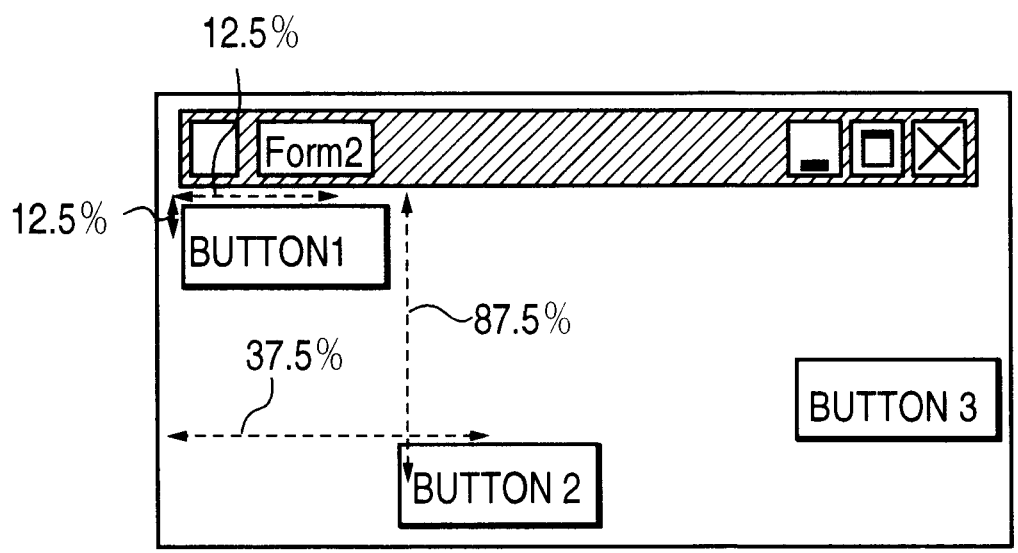
FIG. 20 is a schematic diagram showing an example of a display screen for explaining the third embodiment of the present invention.

When the user selects a GUI part with the mouse and then presses the conversion key for the conversion operation (at step 1901), a conversion commanding portion 26 sends a converting command to a converting portion 5 (at step 1902) and informs a position detecting portion 181 of a GUI part to be converted (at step 1903). The position detecting portion 181 calculates the position of the GUI part (at step 1904). In the case of a window shown in FIG. 20, the values of a button 1 (12.5%, 12.5%), a button 2 (37.5%, 87.5%), and a button (65.5%, 87.5%) are output to the converting portion 5 (at step 1905). Absolute coordinates on a display screen can be used instead of relative coordinates thereon. The converting portion 5 converts the GUI part into a relevant GUI part corresponding to the output data of the converting portion 5 (at step 1906). In the case of the button 1, since the button 1 is disposed at an upper position of the screen, it is converted into an upper menu. In the case of the button 2, since the button 2 is disposed at a lower position of the screen, the button 2 is converted into a lower menu.

The following rule is an example of a rule stored in the rule storing portion 6.

Rule 5[20]:label[$a](>50%,<50%)( ) → button[$a]( )

The values in percent given as arguments of the label are conditions compared with the current position of a GUI part. In other words, when the upper/lower position of the conversion alternative label is larger than 50% (disposed at the lower half of the window) and the left/right position is smaller than 50% (disposed at the left half of the window), the conditions of the rule are satisfied.

According to the present invention, when an optimum alternative of a GUI part is presented to the user in such a manner that a GUI part to be disposed at an upper position of the window is converted into a menu, a more user-friendly GUI can be structured.

In FIG. 18, the part identifying portion 141 is disposed in addition to the position detecting portion 181. However, only the position detecting portion 181 may be disposed. In this case, the rules 1 to 4 are not required.

Next, a fourth embodiment of the present invention will be described.

In a window shown in FIG. 21A, when there are many "buttons", it is troublesome for the user to arrange them with what GUI part as a title thereof. Thus, according to the fourth embodiment, the order of GUI parts is designated corresponding to the positions thereof on the window.

It is assumed that seven GUI parts (buttons) "age:", "age 20 below", "age 20 to age 30", "age 30 to age 40", "age 40 to age 50", "age 50 to age 60", and "age 60 over" are dispersed in a window shown in FIG. 21A.

Figure 22:
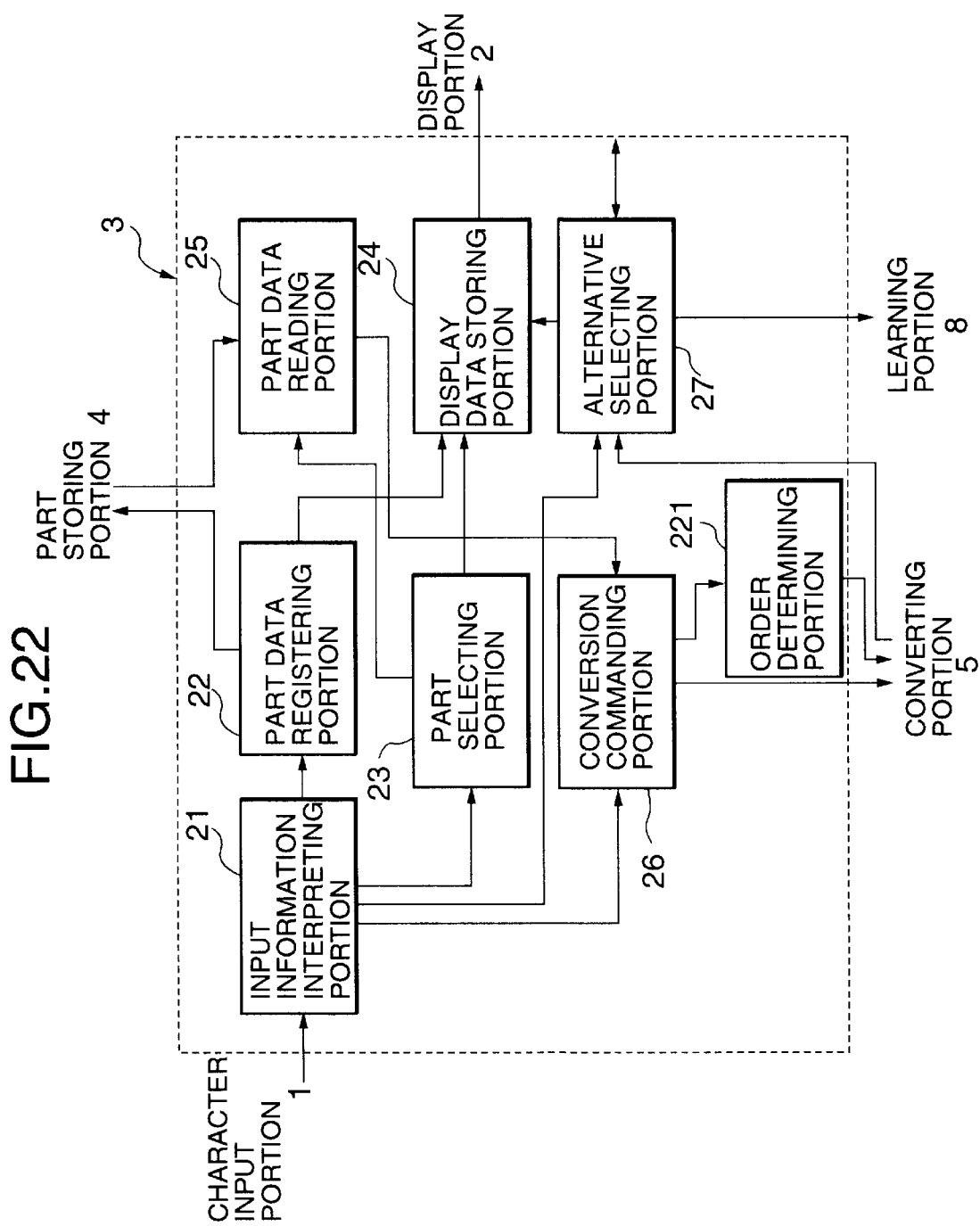
FIG. 22 is a block diagram showing the structure of a GUI edition aiding apparatus according to the fourth embodiment of the present invention.

FIG. 22 is a block diagram showing the structure of the GUI edition aiding apparatus according to the fourth embodiment of the present invention.

When the seven GUI parts shown in FIG. 21A have been selected and the conversion operation has been performed, an order calculating portion 221 shown in FIG. 22 obtains the order of GUI parts to be converted. For example, as shown in FIG. 21B, when a rectangle 211 that inscribes all selected GUI parts is a portrait rectangle, the order calculating portion 221 designates the order of the GUI parts downwardly. When the difference between the height of a particular GUI part and the height of another GUI part is N or less (where N is constant), the order calculating portion 221 designates the order of the GUI parts so that GUI parts on the left have precedence over GUI parts on the right.

When the rectangle 211 that inscribes the selected GUI parts is a landscape rectangle, the order calculating portion 221 designates the order of the GUI parts rightwardly. In this case, when the difference between the width of a particular GUI part and the width of another GUI part is M or less, the order calculating portion 221 designates the order of the GUI parts so that upper GUI parts have precedence over lower GUI parts. Inverse number of parts size being arranged can be used as M and N.

In the example shown in FIG. 21B, since the inscribed rectangle 211 is a portrait rectangle as the determined result, the order calculating portion 221 designates the order of the GUI parts so that the upper GUI parts have precedence over lower GUI parts.

Figure 23:
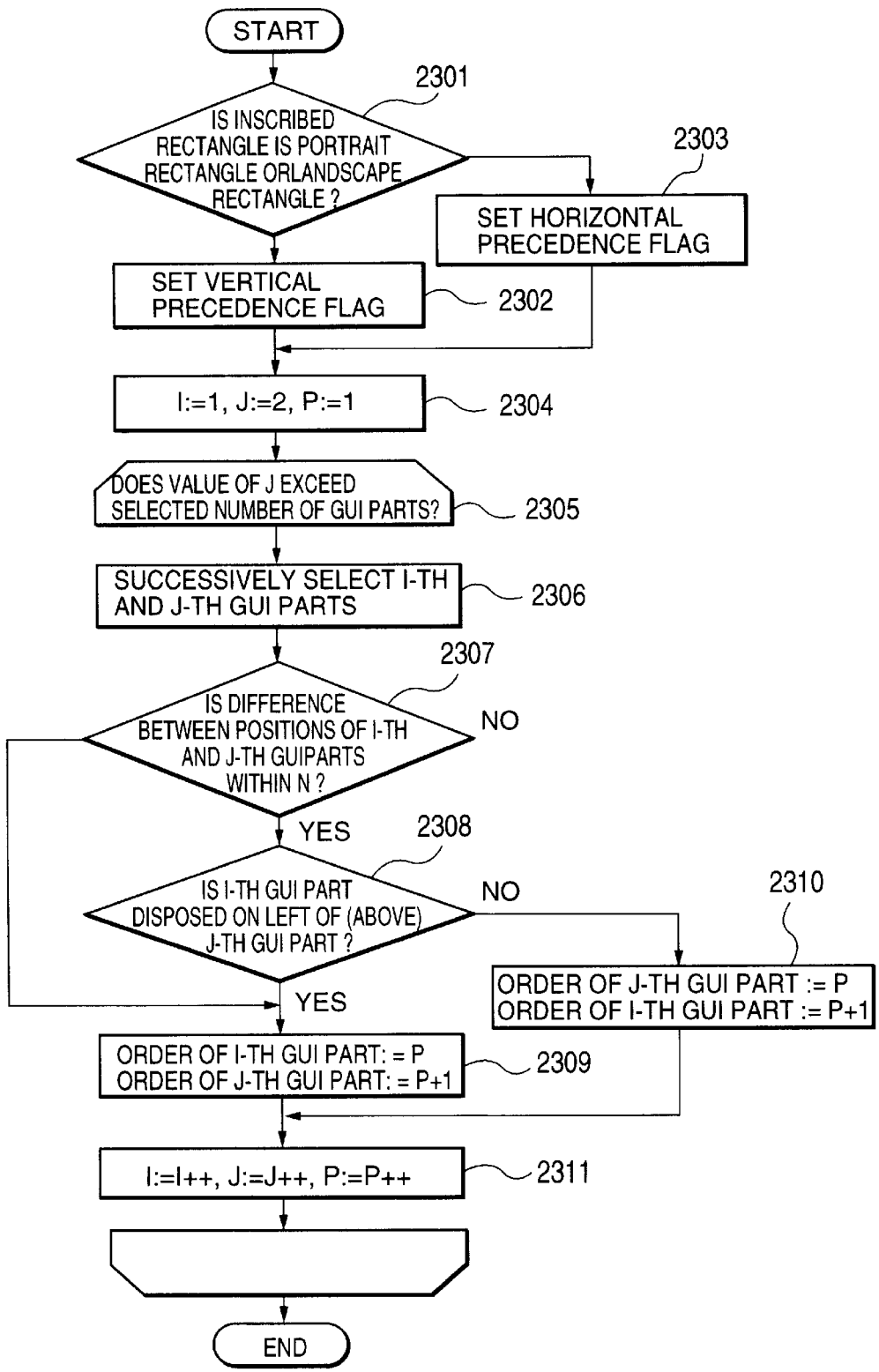
FIG. 23 is a block diagram for explaining an operation of an order determining portion shown in FIG. 22.

FIG. 23 is a flow chart for explaining the operation of the order determining portion 221.

In FIG. 23, the order determining portion 221 determines whether the rectangular area that inscribes all the GAI parts is a portrait rectangle or a landscape rectangle (at step 2301). When the rectangular area is a portrait rectangle as the determined result at step 2301, since the order calculating portion 221 designates the order of the GUI parts so that the upper GUI parts have precedence over the lower GUI parts, the order determining portion 221 sets a vertical precedence flag (at step 2302). On the other hand, when the rectangular area is a landscape rectangle, the order determining portion 221 sets a horizontal precedence flag (at step 2303). In this case, the GUI parts are selected from the direction represented by the flags. Next, the order determining portion 221 performs an initializing process for a loop process (at step 2304). The order determining portion 221 repeats the following process until the value of a variable j exceeds the number of GUI parts (at step 2305).

The order determining portion 221 selects i-th and j-th GUI parts corresponding to the direction precedence flags (at step 2306). Next, the order determining portion 221 determines whether or not the difference between the positions of the two GUI parts is within the constant N (at step 2307). In the case of the vertical precedence, the difference between the positions of two GUI parts is the difference between the horizontal center axes of two GUI parts. Thus, the difference is the height. In the case of the horizontal precedence, the difference between the positions of two GUI parts is the difference between vertical center axes of two GUI parts. When the difference is within the constant N as the determined result at step 2307, the order determining portion 221 determines whether or not the i-th GUI part is disposed on the left of the j-th GUI part (or whether or not the i-th GUI part is disposed above the j-th GUI part in the case of the horizontal precedence) (at step 2308). When the i-th GUI part is disposed on the left of (or above) the j-th GUI part, assuming that the order of the i-th GUI part is designated as p, the order of the j-th GUI part is designated as (p−1) (at step 2309). When the difference is larger than the constant N as the determined result at step 2307, the flow advances to step 2309.

When the i-th GUI part is not disposed on the left of (or above) the j-th GUI part as the determined result at step 2308, the order determining portion 221 substitutes the priority of the i-th GUI part with the priority of the j-th GUI part. Thereafter, the order determining portion 221 shifts a relevant GUI part by one and thereby increments the variable by 1 (at step 2311). The order determining portion 221 repeats the above-described process until the above-described conditions are satisfied.

With the above-described process, the order of the GUI parts is designated as follows.

1. "age:"
2. "age 20 below"
3. "age 20 to age 30"
4. "age 30 to age 40"
5. "age 40 to age 50"
6. "age 50 to age 60"
7. "age 60 over"

In the case that the following rule has been stored in the rule storing portion 6 button[$a]( ),button[$b*]( ) → label[$a]( ),combo[$b*]( )
when the rule is satisfied, a converted screen as shown in FIG. 16 is obtained.

The order designating method of GUI parts is not limited to the above-described method as long as the order thereof is uniquely designated. Examples of the order designating methods are order of selection of parts, left precedence, upper precedence, upper precedence and left precedence for the first L GUI parts.

Next, a fifth embodiment of the present invention will be described.

In the fifth embodiment, a plurality of GUI parts are grouped and converted so as to optimally dispose the GUI parts.

In the case that GUI parts are disposed in a window as shown in FIG. 24A, when they are normally converted, they are displayed as shown in FIG. 24B. On the other hand, according to the fifth embodiment, the GUI parts are converted as shown in FIG. 24C.

Figure 25:
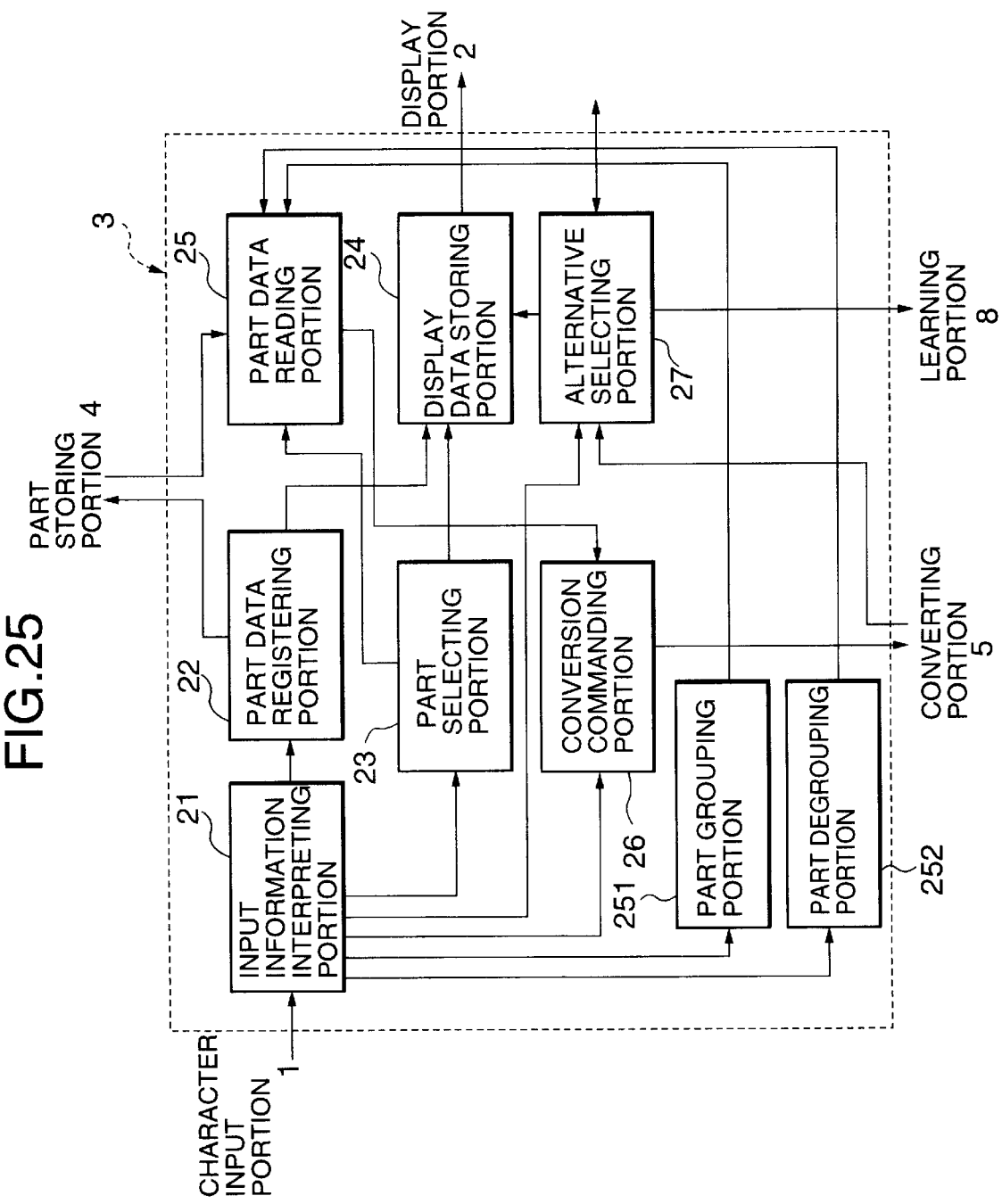
FIG. 25 is a block diagram showing the structure of a GUI edition aiding apparatus according to the fifth embodiment of the present invention.

FIG. 25 is a block diagram showing the structure of a GUI edition aiding apparatus according to the fifth embodiment of the present invention.

In FIG. 25, when a part grouping portion 251 receives a grouping command from the input portion 1, the part grouping portion 251 groups a particular set of GUI parts corresponding to a predetermined rule. Corresponding to a degrouping command received from the input portion 1, a part degrouping portion 252 degroups the set of GUI parts that have been grouped by the part grouping portion 251.

Figure 26:
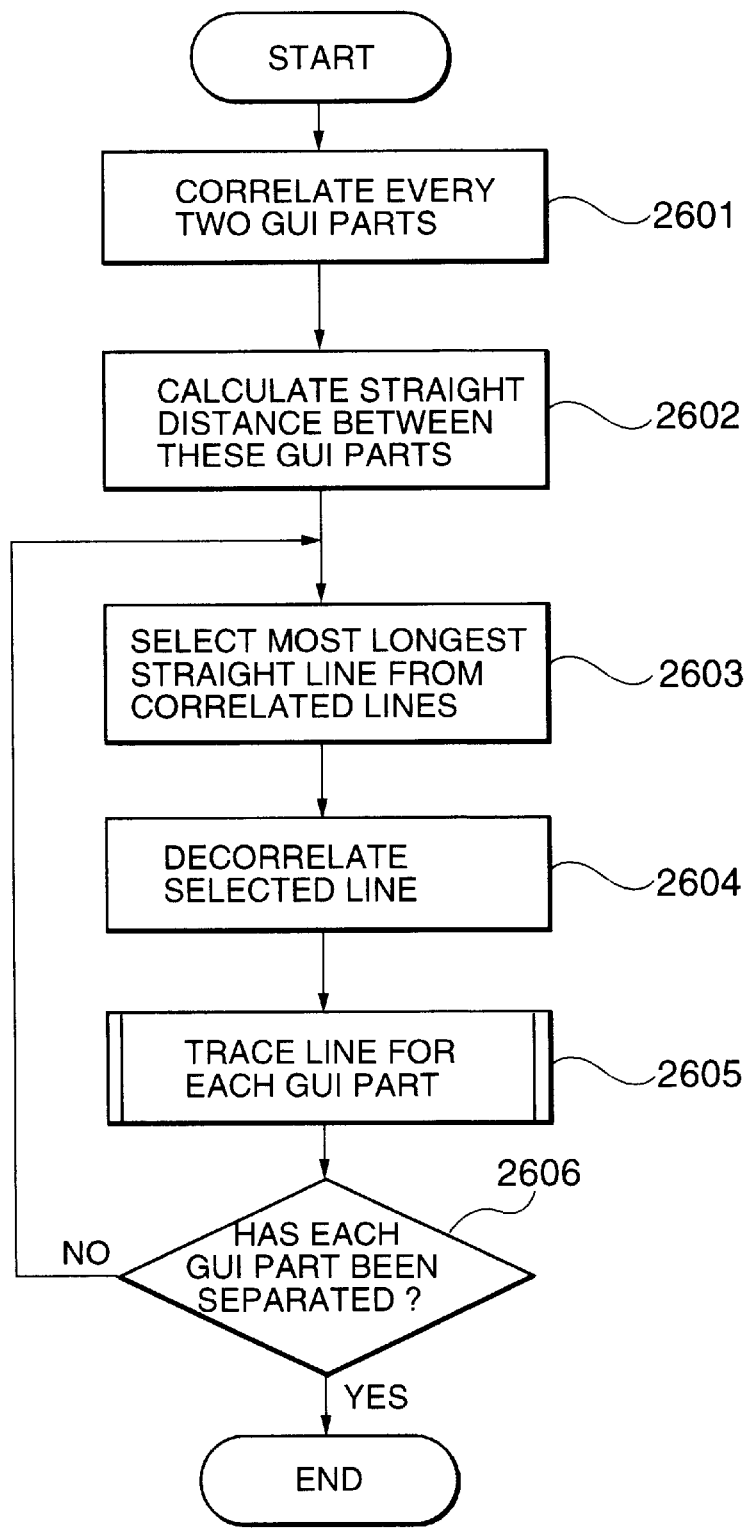
FIG. 26 is a flow chart showing a grouping process of a part grouping portion shown in FIG. 25.

FIG. 26 is a flow chart showing a grouping process of the part grouping portion 251.

The part grouping portion 251 correlates every two of all GUI parts disposed (at step 2601). Next, the part grouping portion 251 obtains the straight distance between these two GUI parts (at step 2602). This distance is the straight distance between the center points of these GUI parts.

Figure 27A:
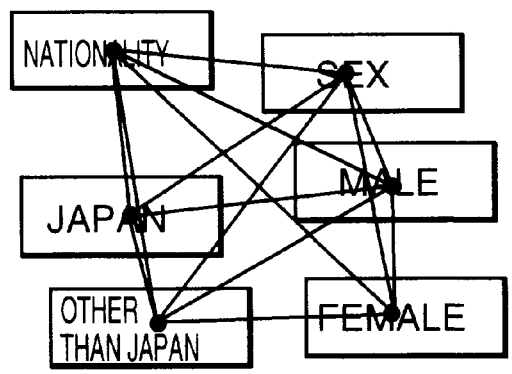
FIGS. 27A to 27C are schematic diagrams showing an example of the grouping process of the part grouping portion shown in FIG. 25.

FIG. 27A is a schematic diagram for calculating the straight distance between every two GUI parts. In other words, FIG. 27A shows the state that the center points of every two GUI parts in the window shown in FIG. 24A are connected with a straight line.

Figure 27B:
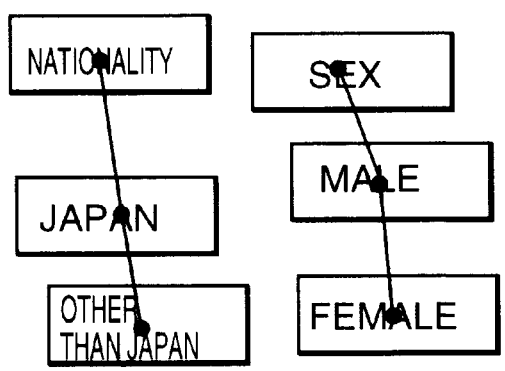

The part grouping portion 251 selects the longest line from the correlated lines (at step 2603). The part grouping portion 251 decorrelates the GUI parts corresponding to the selected line (at step 2604). Thereafter, the part grouping portion 251 successively traces the lines for the individual GUI parts in a predetermined order (at step 2605). The part grouping portion 251 determines whether or not all the GUI parts have been connected with the lines (namely the GUI parts have been separated) (at step 2606). In reality, the part grouping portion 251 traces GUI parts "2" from a GUI part "1" (assuming that the GUI part "nationality" is "1"). When the part grouping portion 251 can trace a GUI part "2" from the GUI part "1", the part grouping portion 251 marks "1" in an internal table (for example, an array variable). Thus, the part grouping portion 251 can determine whether or not each GUI part has been separated (see FIG. 27B).

When the particular GUI part has not been separated as the determined result at step 2606, the flow returns to step 2603 so as to repeat the above-described process.

Figure 27C:
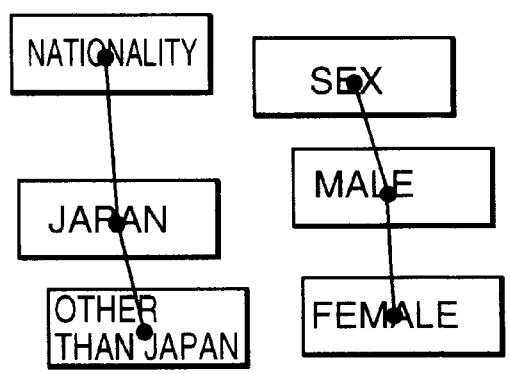

After each GUI part has been decorrelated and the state shown in FIG. 27C has taken place, since a group of "nationality", "Japan", and "other than Japan" and a group of "sex", "male", and "female" have been separated, the part grouping portion 251 completes the process.

The method for calculating the distance between each GUI part is not limited to the above-described method. In other words, the distance between edge positions of GUI parts may be used. In addition, the grouping method is not limited to the above-described method. In other words, after GUI parts to be grouped are selected with the mouse, a grouping command may be input.

Next, a sixth embodiment of the present invention will be described.

In the fifth embodiment, when there are two or more groups with the same distance, the number of groups to be separated may not be determined. To solve this problem, in the sixth embodiment, a group number calculating portion detects the number of groups.

Figure 28:
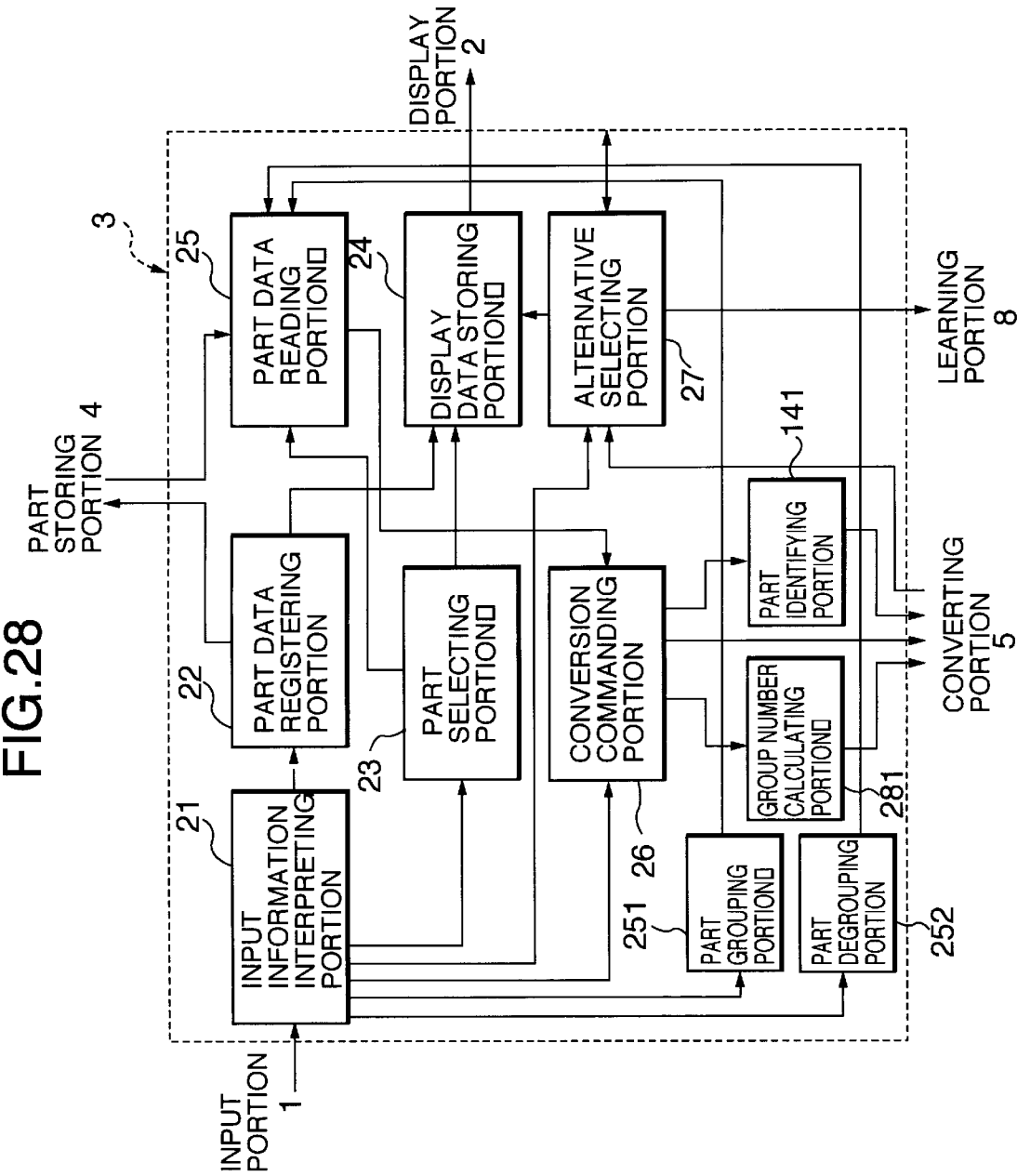
FIG. 28 is a block diagram showing the structure of a GUI edition aiding apparatus according to a sixth embodiment of the present invention.

FIG. 28 is a block diagram showing the structure of a GUI edition aiding apparatus according to the sixth embodiment of the present invention.

When the user inputs a group separating command from an input portion, a part identifying portion 141 identifies the type of a selected GUI part and sends the resultant data to a group number counting portion 281. The group number counting portion 281 counts the number of GUI parts of each group and treats a group with the smallest number of GUI parts as an alternative of the number of groups and sends the resultant data to a grouping portion 251. The grouping portion 251 separates the GUI parts until the commanded number of groups is obtained. When the user inputs the grouping command again, the grouping portion 251 separates the GUI parts until the commanded number of groups is obtained.

As described above, according to the GUI edition aiding apparatus of the present invention, GUI parts can be easily substituted with other GUI parts when they have similar meaning. Thus, a more user-friendly GUI can be easily created.

In addition, according to the present invention, since the type of each GUI part, the position on the screen thereof and the order thereof are considered, a GUI edition aiding apparatus that is superior in operation and conversion efficiency can be provided.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An apparatus for aiding the creation of a display screen as a user's interface including display parts to execute a designated process, comprising:

part data storing means for storing part data including ID information, type information, and position information for identifying at least the display parts;

part displaying means for displaying the display parts on the display screen based on the part data stored in the part data storing means;

inputting means for inputting a type converting command for a first display part displayed on the display screen by the part display means;

rule storing means for storing a rule used to convert the type of the first display part;

part selecting means for selecting, in accordance with the rule stored in the rule storing means, a type of a second display part to which the first display part will be converted when the type converting command for the first display part is input; and controlling means for displaying the second display part instead of the first display part on the display screen.

2. The apparatus as set forth in claim 1, further comprising:

confirming means for confirming the second display part as a display part, wherein the predetermined rule stored in the rule storing means includes as frequency information the number of times the second display part is confirmed as a display part.

3. The apparatus as set forth in claim 2, further comprising:

learning means for updating the frequency information based on a predetermined learning rule when the second display part is confirmed as a display part.

4. The apparatus as set forth in claim 1, further comprising:

weight storing means for storing weight information of each of a plurality of rules that represent the hierarchical relation of a plurality of pieces of the type and ID information of the part data, wherein the part selecting means selects the second display part into which the first display part is converted based on the type information, ID information and the weight information.

5. The apparatus as set forth in claim 1, further comprising:

calculating means for calculating the display position of the first display part on the display screen, wherein the part selecting means selects the second display part into which the first display part is converted based on the calculated display position.

6. The apparatus as set forth in claim 1, further comprising:
- one or more calculating means for calculating each of the display positions of a plurality of first display parts on the display screen; and
- determining means for determining each of the display positions of second display parts on the display screen based on the calculated display positions.

7. The apparatus as set forth in claim 1, further comprising:
- grouping means for grouping a plurality of first display parts; and
- position determining means for determining each of the display positions of second display parts for every group on the display screen based on the rule.

8. The apparatus as set forth in claim 7,
- wherein said grouping means groups the first display parts based on the types of the first display parts.

9. A method for aiding the creation of a display screen as a user's interface including display parts to execute a designated process, comprising the steps of:
- storing part data including ID information, type information, and position information, for identifying at least display parts;
- displaying the display parts on the display screen based on the stored part data;
- inputting a type converting command for a first display part;
- storing a rule to convert the type of the first display part;
- selecting a type of a second display part in accordance with the stored rule when the type converting command of the first display part is input;
- changing the first display part to the second display part; and
- displaying the second display part instead of the first display part on the display screen.

10. A record medium recording a program that causes a display screen as a user's interface including display parts to execute a designated process to be created, the program comprising the functions of:
- storing part data including ID information, type information, and position information, for identifying at least the display parts;
- displaying the display parts on the display screen based on the stored part data;
- inputting a type converting command for a first display part displayed on the display screen;
- storing a rule to convert the type of the first display part;
- selecting a type of a second display part in accordance with the stored rule when the type converting command of the first display part is input;
- changing the first display part to the selected second display part; and
- displaying the second display part instead of the first display part on the display screen.

11. A method for developing a graphical user interface, comprising the steps of:
- displaying a display part on a display portion in a user selected position;
- receiving a converting command corresponding to the display part;
- creating a list of alternate display parts in accordance with a conversion rule; and
- responsive to receiving the converting command, replacing the display part with one of the alternate display parts on the display portion.

12. The method of claim 11, further comprising the steps of:
- receiving a confirmation command confirming the selection of the alternate display part displayed on the display portion;
- storing frequency information indicating the frequency with which the alternate display part is confirmed, where said step of creating a list of alternative display parts is further performed in accordance with said frequency information.

13. The method of claim 11, where the step of creating further comprises the step of assigning a priority to each of the alternate display parts, and the list of alternate display parts is sorted according to the priority.

14. The method of claim 13, where said priority is determined based on the type or label of the display part.

15. The method of claim 11, where the step of creating further comprises the steps of:
- determining the priority of each of a plurality of available conversion rules; and
- applying the available conversion rule with the highest priority when creating the list of alternate display parts.

16. The method of claim 11, where the alternate display part used to replace the display part is selected based on at least the user selected position of the display part.

17. The method of claim 11, where the display part is a selected group of grouped display parts, further comprising the steps of, responsive to receiving the conversion command, determining an order for converting the grouped display parts.

18. The method of claim 17, where the step of determining an order is performed in accordance with the manner in which the grouped display parts were selected.

19. The method of claim 11, where the display part is a selected group of grouped display parts, further comprising the step of decorrelating the selected group of grouped display parts to form two or more sub-groups of grouped display parts.

20. The method of claim 19, where said step of decorrelating is performed in accordance with the distance between the grouped display parts.

* * * * *

UNITED STATES PATENT AND TRADEMARK OFFICE
CERTIFICATE OF CORRECTION

PATENT NO. : 5,973,686
DATED : October 26, 1999
INVENTOR(S) : Nobuhiro Shimogori It is certified that error appears in the above-identified patent and that said Letters Patent is hereby corrected as shown below:

On the cover page, right column, line 1, delete "Wugofshi" and insert --Wugofski--;

line 10, delete "A" and insert --A.--.

Under "BRIEF DESCRIPTION OF DRAWINGS", column 2, line 51, delete "sown" and insert --shown--;

Under "DESCRIPTION OF PREFERRED EMBODIMENTS", column 5, line 32, immediately after "input", delete ",";

column 6, line 41, delete "Label" and insert --label--.

Signed and Sealed this

Fifth Day of December, 2000

Q. TODD DICKINSON

Attest:

Attesting Officer

Director of Patents and Trademarks